(12) United States Patent
Kim et al.

(10) Patent No.: US 9,845,074 B2
(45) Date of Patent: Dec. 19, 2017

(54) WIPER BLADE

(71) Applicants: ADM21 CO., LTD., Cheongyang-gun, Chungcheongnam-do (KR); In Kyu Kim, Ansan-si (KR)

(72) Inventors: In Kyu Kim, Ansan-si (KR); Kyung Su Kim, Cheongyang-gun (KR); Kyung Jong Nam, Cheongyang-gun (KR); Cheong Mo Yang, Cheongyang-gun (KR); Jun Mo Lee, Cheongyang-gun (KR)

(73) Assignee: THE KOREA DEVELOPMENT BANK, Seoul (KR)

( * ) Notice: Subject to any disclaimer, the term of this patent is extended or adjusted under 35 U.S.C. 154(b) by 388 days.

(21) Appl. No.: 14/620,294

(22) Filed: Feb. 12, 2015

(65) Prior Publication Data
US 2015/0251636 A1 Sep. 10, 2015

(30) Foreign Application Priority Data

Mar. 7, 2014 (KR) .................. 10-2014-0027325

(51) Int. Cl.
*B60S 1/40* (2006.01)
*B60S 1/38* (2006.01)

(52) U.S. Cl.
CPC .......... *B60S 1/3801* (2013.01); *B60S 1/3808* (2013.01); *B60S 1/3851* (2013.01); *B60S 1/3868* (2013.01);

(Continued)

(58) Field of Classification Search
CPC .... B60S 1/4003; B60S 1/4045; B60S 1/4048; B60S 2001/4051; B60S 2001/4054; B60S 2001/4058; B60S 2001/4061; B60S 1/3851; B60S 1/3849; B60S 1/3853; B60S 1/3858; B60S 1/3868
See application file for complete search history.

(56) References Cited

U.S. PATENT DOCUMENTS 6,343,401 B1 2/2002 Harashima
7,636,980 B2 12/2009 Nakano
(Continued)

FOREIGN PATENT DOCUMENTS

CN 101151180 A 3/2008
CN 102149582 A 8/2011
(Continued)

*Primary Examiner* — Gary Graham
(74) *Attorney, Agent, or Firm* — Sughrue Mion, PLLC

(57) ABSTRACT

A wiper blade suitable to three types of wiper arms. A connector assembly of the wiper blade is detachably connected to wiper arms having first to third coupling units at a distal end respectively. The connector assembly has an adaptor and a slide cover slidably joined to the adaptor. The slide cover is moved to the adaptor in a first movement direction to fix the first to third coupling units to the adaptor and is moved from the adaptor in a second movement direction opposite to the first movement direction to release fixation between the coupling units and the adaptor. The adaptor has a support protrusion supporting support surfaces of the first to third coupling units. The slide cover has a push surface contacting the contact surfaces of the first to third coupling units to push the first to third coupling units towards the support protrusion of the adaptor.

18 Claims, 31 Drawing Sheets

(52) U.S. Cl.
CPC ........... *B60S 1/4003* (2013.01); *B60S 1/4045* (2013.01); *B60S 1/4048* (2013.01); *B60S 2001/4051* (2013.01); *B60S 2001/4054* (2013.01)

(56) References Cited

U.S. PATENT DOCUMENTS

| | | | |
|---|---|---|---|
| 7,921,504 | B1 | 4/2011 | Chiang |
| 8,413,292 | B2 * | 4/2013 | Yang .................... B60S 1/3801 15/250.32 |
| 8,429,786 | B2 | 4/2013 | Van Baelen et al. |
| 8,479,350 | B2 | 7/2013 | Kim et al. |
| 8,505,151 | B2 | 8/2013 | Depondt et al. |
| 8,650,701 | B2 * | 2/2014 | Yang .................... B60S 1/3867 15/250.32 |
| 8,689,389 | B2 | 4/2014 | Kim et al. |
| 8,800,096 | B2 | 8/2014 | Kim et al. |
| 8,935,825 | B2 | 1/2015 | Song |
| 9,108,595 | B2 * | 8/2015 | Tolentino ................ B60S 1/387 |
| 9,333,948 | B2 | 5/2016 | Depondt |
| 2003/0221276 | A1 | 12/2003 | Siklosi |
| 2012/0174334 | A1 | 7/2012 | Song et al. |
| 2012/0279008 | A1 | 11/2012 | Depondt |
| 2012/0317740 | A1 | 12/2012 | Yang et al. |
| 2014/0115811 | A1 | 5/2014 | Kim et al. |

FOREIGN PATENT DOCUMENTS

| | | | |
|---|---|---|---|
| CN | 102958765 A | | 3/2013 |
| CN | 103097209 A | | 5/2013 |
| JP | 2013-507285 A | | 3/2013 |
| KR | 2001-0030699 A | | 4/2001 |
| KR | 10-2006-0051763 A | | 5/2006 |
| KR | 10-2007-0096733 A | | 10/2007 |
| KR | 10-0812773 B1 | | 3/2008 |
| KR | 10-0920169 B1 | | 9/2009 |
| KR | 10-2010-0015734 A | | 2/2010 |
| KR | 10-1036577 B1 | | 5/2011 |
| KR | 10-1189722 | * | 10/2012 |
| KR | 10-1245514 B1 | | 4/2013 |
| KR | 10-1335312 B1 | | 12/2013 |
| KR | 10-2014-0000779 A | | 1/2014 |
| WO | 2008/136579 A1 | | 11/2008 |

* cited by examiner

WIPER BLADE

CROSS-REFERENCE TO RELATED APPLICATIONS

This application claims priority from Korean Patent Application No. 10-2014-0027325 (filed on Mar. 7, 2014), the entire subject matter of which is incorporated herein by reference.

TECHNICAL FIELD

The present disclosure relates to a wiper blade with a spoiler integrated therein.

BACKGROUND

A wiper blade for wiping a surface of a windshield has a wiper rubber and a lever assembly. The wiper rubber contacts the windshield surface. The lever assembly holds and supports the wiper rubber along its longitudinal direction. The lever assembly of a conventional wiper blade includes one main lever and a plurality of yoke levers linked to the main lever. The main lever is connected to the wiper arm. The yoke lever is linked to the main lever or another yoke lever at its middle. The main lever and the yoke lever are hinge-connected by means of a pin or rivet which passes through the main lever and the yoke lever.

When a motor vehicle runs, wind or air stream impinging against the windshield applies a force to the wiper blade throughout the longitudinal direction of the wiper blade. The force caused by the wind or air stream acts to lift the wiper blade from the windshield surface. The faster the motor vehicle runs, the stronger such a lift force becomes. This weakens the contact between the wiper rubber and the windshield surface, thereby deteriorating wiping performance.

To address the deterioration in wiping performance caused by the lift of a wiper blade, it is known in the art to attach a spoiler to the wiper blade. The spoiler interacts with wind or air stream and thereby applies a force in a direction opposite to the lift of the wiper blade. By way of example, Korean Patent Application Publication No. 2001-0030699 proposes a wiper blade with a spoiler attached to a main lever. It is also known in the art to attach a cover, which covers the main lever or the yoke lever of the wiper blade and has the shape of a spoiler, to the wiper blade. By way of another example, Korean Patent Application Publication No. 2006-0051763 proposes a wiper blade with such a cover.

SUMMARY

The lower an overall height of the lever assembly supporting the wiper blade, the less air resistance the lever assembly could be subjected to. However, to reduce the height of the lever assembly of conventional wiper blade has limits due to a furcate configuration of its levers. The wiper blade with a spoiler attached requires that the spoiler be prepared separately. This may lead to the increase in manufacturing costs of the wiper blade and detachment of the spoiler. Further, the wiper blade with a cover covering the main lever or the yoke lever requires parts for joining the cover to the lever assembly. This may increase the number of the parts of the wiper blade, increasing manufacturing costs.

Further, in the lever assembly of a conventional wiper blade, the main lever and the yoke lever are connected by means of a connection element such as a pin or rivet. Use of such a connection element may increase the number of the parts of the wiper blade and easy assembly of the wiper blade cannot be achieved.

The wiper blade is connected to the wiper arm through detachable connection between a connection unit provided in the wiper blade and a coupling unit provided in a distal end of the wiper arm. Various types of wiper arms, the respective coupling units of which have the configuration different from one another, are used in the art, while the wiper blade employs one of variously-configured connection units, each of which is only adapted to the respective coupling units. Thus, wiper blade manufacturers must design and develop various connection units, each of which is only suitable for the respective coupling units of wiper arms. This may increase the number of the parts constituting the connections unit and cause difficulties in appropriate maintenance. Further, the users must choose the wiper blade that is only suitable for the coupling unit of the wiper arm equipped to their own cars, resulting in difficulty and inconvenience in choosing wiper blades.

The present disclosure is directed to solving the aforementioned problems of the prior art. The present disclosure provides a wiper blade wherein a lever assembly holding a wiper rubber has a low overall height and is integrated with a spoiler. Further, the present disclosure provides a wiper blade wherein the lever assembly can be assembled through simple manipulation. Further, the present disclosure provides a wiper blade which has the aforementioned characteristics and is connectable to at least three types of wiper arms.

Embodiments disclosed herein provide wiper blades that have a lever assembly with a spoiler integrated therein and are connectable to at least three types of wiper arms.

In one exemplary embodiment, the wiper blade comprises: a wiper rubber; a lever assembly holding the wiper rubber and comprising a plurality of levers, adjacent levers of which are rotatably connected; and a connector assembly detachably connected to a wiper arm which includes one of first to third coupling units at a distal end. Each of the first to third coupling units includes: a receiving portion extending in front and rear directions; a contact surface and a support surface for fixation in the front and rear directions; and a tongue for fixation in a vertical direction vertical to the front and rear directions. The connector assembly includes: a bracket detachably joined to the lever assembly and having a rotation shaft; an adaptor rotatably mounted to the bracket through the rotation shaft; and a slide cover slidably joined to the adaptor. The slide cover is moved to the adaptor in a first movement direction parallel to a longitudinal direction of the lever assembly to fix the first to third coupling units to the adaptor. The slide cover is moved from the adaptor in a second movement direction opposite to the first movement direction in the longitudinal direction of the lever assembly to release fixation between the first to third coupling units and the adaptor. The adaptor includes: an insertion portion having a pair of lateral walls rotatably coupled to the rotation shaft and being inserted to the receiving portions of the first to third coupling units; a first support protrusion formed at an end of the insertion portion in the first movement direction and supporting the support surfaces of the first and second coupling units; and a second support protrusion formed at the end of the insertion portion in the first movement direction and supporting the support surface of the third coupling unit. The slide cover includes: a first push surface contacting the contact surfaces of the first and second coupling units to push the first and second coupling units towards the first support protrusion in the first movement direction; a second push surface contacting the contact surface of the third coupling unit to push the third coupling unit towards the second support protrusion in the first movement direction; a hood covering the tongues of the first and second coupling units; and a latch surface covering at least a portion of a top surface of the tongue of the third coupling unit.

In an embodiment, the adaptor includes a locking latch locking the slide cover when the slide cover fixes the first to third coupling units to the adaptor. In one embodiment, the locking latch includes: a finger curvable laterally inwardly and extending from the lateral wall in the second movement direction; and a latch protrusion formed at a tip end of the finger. The slide cover includes a latch groove which the latch protrusion engages. Further, the slide cover includes a curved surface portion, which is inwardly concave when viewing the slide cover from top, and the latch groove is located in the curved surface portion. When the slide cover fixes the first to third coupling units to the adaptor, the latch protrusion protrudes laterally outwardly from the curved surface portion. Further, in one embodiment, the latch protrusion includes a curved surface at an end in the first movement direction. The latch protrusion contacts an end of the latch groove in the first movement direction at the curved surface.

In an embodiment, the slide cover includes an engagement pin movable laterally inwardly and laterally outwardly and the adaptor includes a pin groove, which receives the engagement pin, at a bottom edge of the lateral wall of the insertion portion. The engagement pin contacts an end of the pin groove in the second movement direction, thereby limiting movement of the slide cover in the second movement direction. In one embodiment, the slide cover includes an elastic arm curvable laterally inwardly and laterally outwardly and the engagement pin is provided in a tip end of the elastic arm. Further, the engagement pin includes a slope contacting the end of the pin groove in the second movement direction. The third coupling unit includes a claw protruding from a front end of the tongue of the third coupling unit towards an inside of the receiving portion of the third coupling unit. In one embodiment, the adaptor includes a vertically extending passage groove, through which the claw of the third coupling unit passes, in the lateral wall of the insertion portion. When the engagement pin contacts the end of the pin groove in the second movement direction, the second push surface is positioned away in the second movement direction from an edge of the passage groove in the second movement direction. Further, in one embodiment, when the slide cover is moved in the first movement direction and fixes the third coupling unit to the adaptor, the engagement pin is positioned above a top surface of the tongue of the third coupling unit.

In an embodiment, the second push surface and the latch surface adjoin each other and form a right angle therebetween.

The tongue of the second coupling unit comprises first and second tongues that are longitudinally apart from each other. In an embodiment, the hood of the slide cover comprises first and second hoods that are apart from each other in the first movement direction. The first hood covers the tongue of the first coupling unit or the first tongue of the second coupling unit and the second hood covers the second tongue of the second coupling unit. In one embodiment, the slide cover includes: a slider slidably fitted to the adaptor; and a handle extending from the slider in the second movement direction. The first hood is formed at an end of the handle in the first movement direction and the second hood is formed at an end of the slider in the first movement direction.

In an embodiment, the slide cover includes: a slider slidably fitted to the insertion portion of the adaptor; and a pair of slide slots formed in the slider and extending in the first and second movement directions. The slider is located inside the insertion portion of the adaptor with both ends of the rotation shaft being fitted to the slide slots.

In an embodiment, the support surface of the first coupling unit comprises a surface of a V-shaped notch and the support surface of the second coupling unit comprises a surface of an L-shaped notch. The first support protrusion of the adaptor supports the V-shaped notch or the L-shaped notch in the second movement direction.

In an embodiment, the lever assembly includes: a first lever located centrally in the lever assembly and having two first inclined surfaces that extend longitudinally and are spaced apart from each other; and a connector seat provided in the first lever between said two first inclined surfaces. The connector seat includes: a seat surface on which the bracket is seated; a stepped surface extending along a periphery of the seat surface and separating the seat surface from the first lever; an insertion slot provided at a longitudinal end of the seat surface; and a pair of snap protrusions located adjacent to the seat surface apart from the insertion slot and protruding in a direction orthogonal to a longitudinal direction of the seat surface. The bracket includes: a contact surface contacting the seat surface; a flange extending along a periphery of the contact surface contacting the seat surface, the flange fitting on the stepped surface; an insertion protrusion inserted to the insertion slot of the connector seat; and a pair of snap slots, which the pair of snap protrusions of the connector seat snap-engage respectively, being located above a bottom edge of the flange.

In an embodiment, the flange includes an ear portion formed by a portion of an edge of the flange. Said portion of an edge of the flange is opposite each of the snap slots and protrudes outwardly. The connector seat includes an auxiliary stepped surface between the stepped surface and a bottom edge of the first lever. The auxiliary stepped surface is continued from the stepped surface and is located below the snap protrusion.

In an embodiment, the lever assembly further includes: a pair of second levers rotatably connected to longitudinal outer ends of the first lever respectively and having a second inclined surface extending longitudinally; and a pair of third levers rotatably connected to longitudinal inner ends or longitudinal outer ends of the second levers respectively and having a third inclined surface extending longitudinally. The first lever and the second lever are rotatably connected to each other by fitting between a pair of fitting protrusions provided in one of the first and second levers and a pair of fitting holes provided in the other of the first and second levers. The second lever and the third lever are rotatably connected to each other by fitting between a pair of fitting protrusions provided in one of the second and third levers and a pair of fitting holes provided in the other of the second and third levers. In such an embodiment, the first lever has an end surface, which is inclined towards a longitudinal outer end of the third lever, at the longitudinal outer end thereof. Further, the second lever has a stepped surface, which is contactable to the end surface of the first lever and is inclined towards the longitudinal outer end of the third lever, and has an end surface, which is inclined towards the longitudinal outer end of the third lever, at the longitudinal outer end thereof. Further, the third lever has a stepped surface which is contactable to the end surface of the second lever and is inclined towards the longitudinal outer end of the third lever. The stepped surface of the third lever is inclined towards the longitudinal outer end of the third lever at an angle less than the stepped surface of the second lever.

In the wiper blades according to the embodiments, the levers with partial spoilers are adjoined linearly and form the lever assembly, providing the wiper blade that has a low overall height and an integrally-formed spoiler.

In the lever assembly of the wiper blades according to the embodiments, adjacent levers are hinge-connected to each other by fitting between fitting protrusions and fitting holes, providing a lever assembly of a wiper blade with the benefit of ease of assembly.

Further, the wiper blade according to the embodiments includes the connector assembly that is configured to be detachably connected to three types of wiper arms. Thus, the wiper blade is applicable to these three types of wiper arms. The connector assembly is connected to the wiper arm by means of slide action. Thus, the user can easily connect and separate the connector assembly to and from the wiper arm.

BRIEF DESCRIPTION OF THE DRAWINGS

Arrangements and embodiments may be described in detail with reference to the following drawings in which like reference numerals refer to like elements or components, wherein.

DETAILED DESCRIPTION

Figure 1:
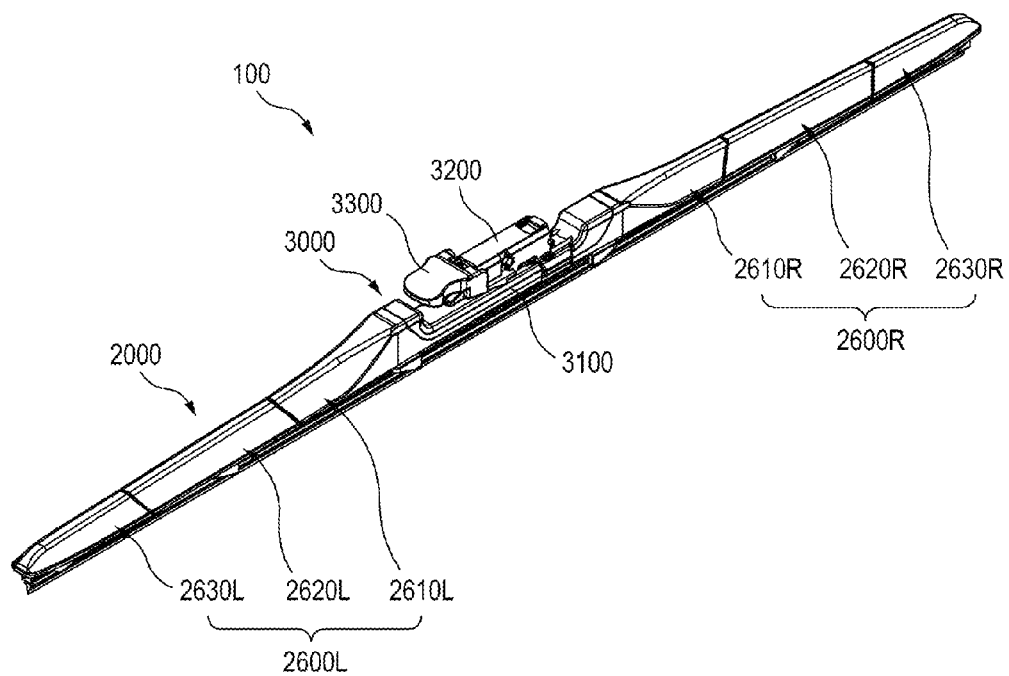
FIG. 1 is a perspective view showing a wiper blade in accordance with an embodiment.
Figure 2:
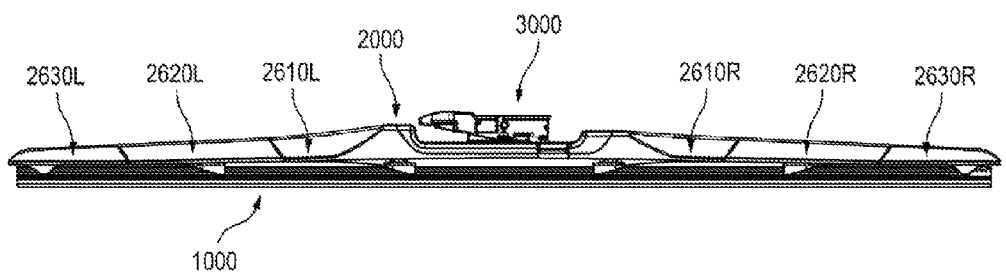
FIG. 2 is a front view of the wiper blade shown in FIG. 1.
Figure 3:
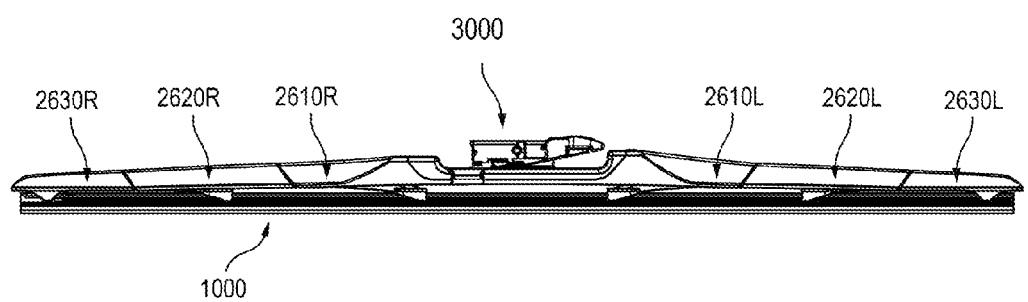
FIG. 3 is a rear view of the wiper blade shown in FIG. 1.
Figure 4:
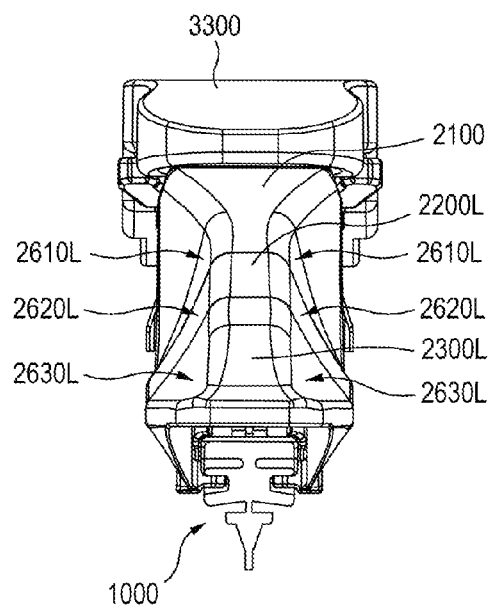
FIG. 4 is a left side view of the wiper blade shown in FIG. 1.
Figure 5:
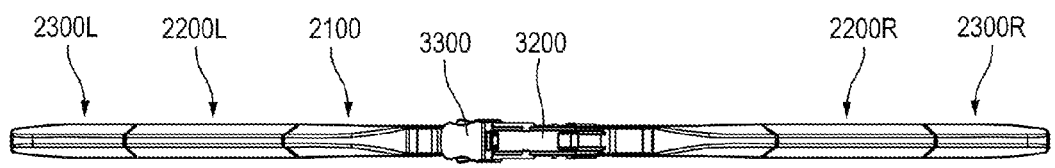
FIG. 5 is a top view of the wiper blade shown in FIG. 1.

Detailed descriptions are made as to embodiments of a wiper blade with reference to the accompanying drawings. The directional term "top," "upper," "upward" or the like as used herein is generally based on a direction, in which a lever assembly is disposed relative to a wiper rubber in the accompanying drawings, while the directional term "bottom," "lower," "downward" or the like generally refers to a direction opposite to the upper or upward direction. A wiper blade shown in the accompanying drawings may be otherwise oriented and the aforementioned directional terms may be interpreted accordingly. Further, as used herein, the term "longitudinal inner end" generally refers to an end that is closer to a center of a wiper blade in a longitudinal direction of an element, while the term "longitudinal outer end" refers to an end that is distant from the center of the wiper blade in the longitudinal direction of said element.

A wiper blade 100 according to an embodiment includes a wiper rubber assembly 1000, a lever assembly 2000 and a connector assembly 3000. The wiper rubber assembly 1000 includes a wiper rubber 1100 contacting the surface of a windshield. The lever assembly 2000 holds and supports the wiper rubber assembly. The connector assembly 3000 is detachably joined to the lever assembly 2000 and connects the lever assembly 2000 to a wiper arm.

The lever assembly 2000 includes a plurality of levers, which are adjoined linearly in a longitudinal direction of the wiper rubber 1100. Adjacent two levers are rotatably connected to each other by means of a hinge-connection portion, which directly hingedly interconnects the inner surface of one of the adjacent two levers and the outer surface of the other of the adjacent two levers. If the adjacent two levers are connected, then the outer surface of the other of said adjacent two levers is situated inside the inner surface of the one of said adjacent two levers and is thus hidden in the inside of the one of said adjacent two levers when viewed from outside. In one embodiment, the inner surface of the one of said adjacent two levers is the inner surface of a spoiler portion, while the outer surface of the other of said adjacent two levers is the outer surface of an arm portion formed in the lever. In one embodiment, said hinge-connection portion comprises a pair of fitting protrusions 2411, 2412 and a pair of fitting holes 2421, 2422 to which the fitting protrusions 2411, 2412 are fitted respectively. The fitting protrusion 2411, 2412 are provided in the one of said adjacent two levers, while the fitting holes 2421, 2422 are provided in the other of said adjacent two levers.

In embodiments, one of said adjacent two levers has an element configured to contact the other of said adjacent two levers in a width direction so that the other of said adjacent two levers hinge-joined to the one of said adjacent two levers can be retained without shake. In one embodiment, said element comprises a pair of contact surfaces, which are oppositely located inside the one of said adjacent two levers.

The wiper blades according to embodiments include a spoiler 2600L, 2600R that produces a reaction force preventing the lift of the wiper blade, which wind or air stream may cause. The spoiler extends along the longitudinal direction of the lever assembly 2000 and is integrated in the lever assembly 2000. The spoiler 2600L, 2600R reacts to wind or air stream impinging against the wiper blade 100 during the running of a motor vehicle and produces a reaction force preventing the wiper blade 100 from being lifted. Such a reaction force is produced by interaction between wind or air stream and a cross-sectional contour shape of the lever assembly 2000 with the spoiler 2600L, 2600R. In one embodiment, a partial spoiler, which becomes a part of the spoiler, is integrated in one or more levers among the plurality of levers of the lever assembly 2000. The partial spoilers of each lever are adjoined linearly, thereby forming the spoiler 2600L, 2600R of the wiper blade 100. The partial spoiler is defined by at least one or a pair of inclined surfaces that extend in the longitudinal direction of the lever and are inclined inwardly of the lever in the width direction of the lever. The inclined surface forms a portion or the entirety of a lateral surface of the lever. In an example where the lever has one inclined surface, the lateral surface of the lever, which is opposite the inclined surface, may be a vertical surface. In another example where the lever has a pair of inclined surfaces, the pair of inclined surfaces may be the portion or the entirety of the both lateral surfaces of the lever. The inclined surface may include a flat surface, a concave or convex curved surface, etc., when viewing the lever from a side or cross-section. That is, in an example where the lever has one inclined surface, the cross-sectional contour shape of the spoiler 2600L, 2600R comprises a straight line, a concave curved line or a convex curved line. In another example where the lever has a pair of inclined surfaces, the cross-sectional contour shape of the spoiler 2600L, 2600R comprises a pair of straight lines, a pair of concave curved lines or a pair of convex curved lines, which are symmetrical in the width direction of the lever assembly 2000. Further, when viewing the lever from the side or cross-section, the inclined surfaces may be at least partially symmetrical in the width direction of the lever. One of the pair of the inclined surfaces may have a width greater than that of the other. Further, the width of the inclined surface may be constant or diminish towards a longitudinal outer end of the lever assembly.

Two or more levers of the lever assembly 2000 have a spoiler portion, in which the inclined surface is formed, and an arm portion, which linearly extends oppositely from the spoiler portion. A finger, which is an element for grasping the wiper rubber, is provided at a distal end of the arm portion. When adjacent levers are joined, the arm portion of one of the adjacent levers is hidden within the spoiler portion of the other of the adjacent levers.

In one embodiment, the lever assembly 2000 comprises a first lever 2100 centrally located in the lever assembly, and a pair of second levers rotatably connected to longitudinal outer ends of the first lever respectively. The second lever has a finger grasping the wiper rubber at a longitudinal outer end or has fingers grasping the wiper rubber at longitudinal both ends. By way of another example of the lever assembly, the lever assembly 2000 comprises the following: a first lever 2100 centrally located in the lever assembly; a pair of second levers rotatably connected to longitudinal outer ends of the first lever respectively and having the finger at a longitudinal outer end; and a pair of third levers rotatably connected to the longitudinal inner ends of the second levers respectively and having fingers at longitudinal both ends. By way of yet another example of the lever assembly, the lever assembly 2000 comprises the following: a first lever 2100 centrally located in the lever assembly; a pair of second levers rotatably connected to longitudinal outer ends of the first lever respectively and having the finger at a longitudinal inner end; and a pair of third levers rotatably connected to the longitudinal outer ends of the second levers respectively and having fingers at longitudinal both ends. By way of still another example of the lever assembly, the lever assembly 2000 comprises the following: a first lever 2100 centrally located in the lever assembly; a pair of second levers rotatably connected to longitudinal outer ends of the first lever respectively and having the finger at a longitudinal inner end; a pair of third levers rotatably connected to longitudinal outer ends of the second levers respectively and having the finger at a longitudinal inner end; and a pair of fourth levers rotatably connected to the longitudinal outer ends of the third levers respectively and having fingers at longitudinal both ends.

In the foregoing examples of the lever assembly, the first lever 2100 has two, longitudinally-extending inclined surfaces, which define a partial spoiler and are spaced apart, in one lateral surface. Alternatively, the first lever 2100 has a pair of inclined surfaces in both lateral surfaces at a longitudinal end portion and another pair of inclined surfaces in both lateral surfaces at an opposite longitudinal end portion. In the foregoing examples of the lever assembly, each of the second to fourth levers has one inclined surface in one lateral surface thereof or a pair of inclined surfaces in both lateral surfaces thereof.

The lever assembly 2000 of the wiper blade according to embodiments includes a connector seat 2500, which is configured such that a base part of the connector assembly 3000 is seated on and fixed to the connector seat. In one embodiment, the connector seat 2500 is provided in the first lever 2100. The connector seat 2500 includes a seat surface 2510 on which the bracket 3100 is seated. The bracket 3100 includes a contact surface 3121, 3122, 3123 that is formed complementarily to the seat surface. In one embodiment, the seat surface 2510 of the connector seat has an elongated U shape, which is concave towards a bottom of the first lever 2100 when viewing the first lever 2100 from front. Thus, the connector seat 2500 can be positioned low in the first lever 2100 and the wiper blade 100 can have a total height that is low. Further, in one embodiment, the seat surface 2510 of the connector seat is positioned within the first lever 2100 when viewing the first lever 2100 from the top.

In one embodiment, the connector seat 2500 includes a stepped surface 2520 that is formed along a periphery of the seat surface 2510 and thus separates the connector seat 2500 from the first lever 2100. Further, the bracket 3100 includes a flange 3130 that is formed along a periphery of the contact surface 3121, 3122, 3123 of the bracket. The flange 3130 is formed complementarily to the stepped surface so as to fit on the stepped surface. Since the bracket 3100 is seated on the connector seat 2500 through engagement between the stepped surface and the flange, the bracket 3100 can be positioned to the connector seat 2500 with ease and accuracy.

The bracket 3100 can be positioned to the connector seat 2500 in such a way that one end of the bracket 3100 is inserted to one end of the connector seat 2500 corresponding to the one end of the bracket. In one embodiment, the connector seat 2500 includes an insertion slot 2531 at its one end and the bracket 3100 includes an insertion protrusion 3141, which is inserted to the insertion slot 2531. Further, after the one end of the bracket is inserted to the connector seat 2500, the bracket 3100 is rotated towards the connector seat 2500. Then, the bracket 3100 is fixed to the connector seat 2500 through snap engagement between the opposite end of the bracket 3100 or the portion of the bracket adjacent to the opposite end and the corresponding opposite end of the connector seat 2500 or the portion of the connector seat adjacent to the corresponding opposite end. In one embodiment, the connector seat 2500 includes a snap protrusion 2532, which protrudes in a width direction, at the vicinity of the opposite end and the bracket 3100 includes a snap slot 3142 which the snap protrusion 2532 snap-engages. Further, in one embodiment, a distance between longitudinal inner ends of the stepped surface 2520 of the connector seat is less than a distance between a tip end of the insertion protrusion and an edge of the flange located opposite the insertion protrusion. Thus, the bracket 3100 can be positioned to the connector seat in such a way of only inserting the insertion protrusion to the insertion slot. Further, in one embodiment, the bracket 3100 includes an ear portion 3134. A portion of the flange 3130, which corresponds to the snap slot, protrudes outwardly, thus forming the ear portion 3134. The ear portion defines the seat position of the bracket 3100 relative to the connector seat 2500 and therefore may be used for easy detachment of the bracket 3100.

The connector assembly 3000 of the wiper blade according to embodiments is suitable to at least three types of wiper arms 200, 300, 400 which include differently configured coupling units at respective distal ends. The coupling units of said three types of wiper arms and the connector assembly 3000 are detachably connected through fixation in front and rear directions, fixation in a vertical direction vertical to the front and rear directions, and fixation in a horizontal direction orthogonal to the front and rear directions and vertical to the vertical direction. The connector assembly 3000 includes an adaptor 3200, which contacts the coupling units, and a slide cover 3300, which is slidably coupled to the adaptor. Said fixation in the front and rear directions is achieved in such a way that the slide cover 3300 is moved to the adaptor 3200 and the adaptor 3200 and the slide cover 3300 sandwich the coupling units in the front and rear directions. In one embodiment, said fixation in the vertical direction is achieved in such a way that the slide cover 3300 is moved to the adaptor and a portion of the slide cover 3300 covers a protrusion portion provided in the coupling unit above the protrusion portion. The slide movement of the slide cover 3300 to the adaptor 3200 detachably connects the adaptor 3200 and the coupling units. Accordingly, the user can easily carry out the fixation and separation between the connector assembly 3000 and the coupling units.

Referring to FIGS. 1 to 40, a wiper blade 100 according to an embodiment includes a wiper rubber assembly 1000, a lever assembly 2000 and a connector assembly 3000. The wiper rubber assembly 1000 includes a wiper rubber. The lever assembly 2000 holds and supports the wiper rubber assembly 1000. The connector assembly 3000 is detachably joined to the lever assembly 2000 and is used for connection to wiper arms.

The wiper rubber assembly 1000 includes a wiper strip or wiper rubber 1100, which is placed on the surface of a windshield of a motor vehicle, and spring rails 1200, which are fitted to the wiper rubber 1100 and impart rigidity to the wiper rubber 1100.

Figure 6:
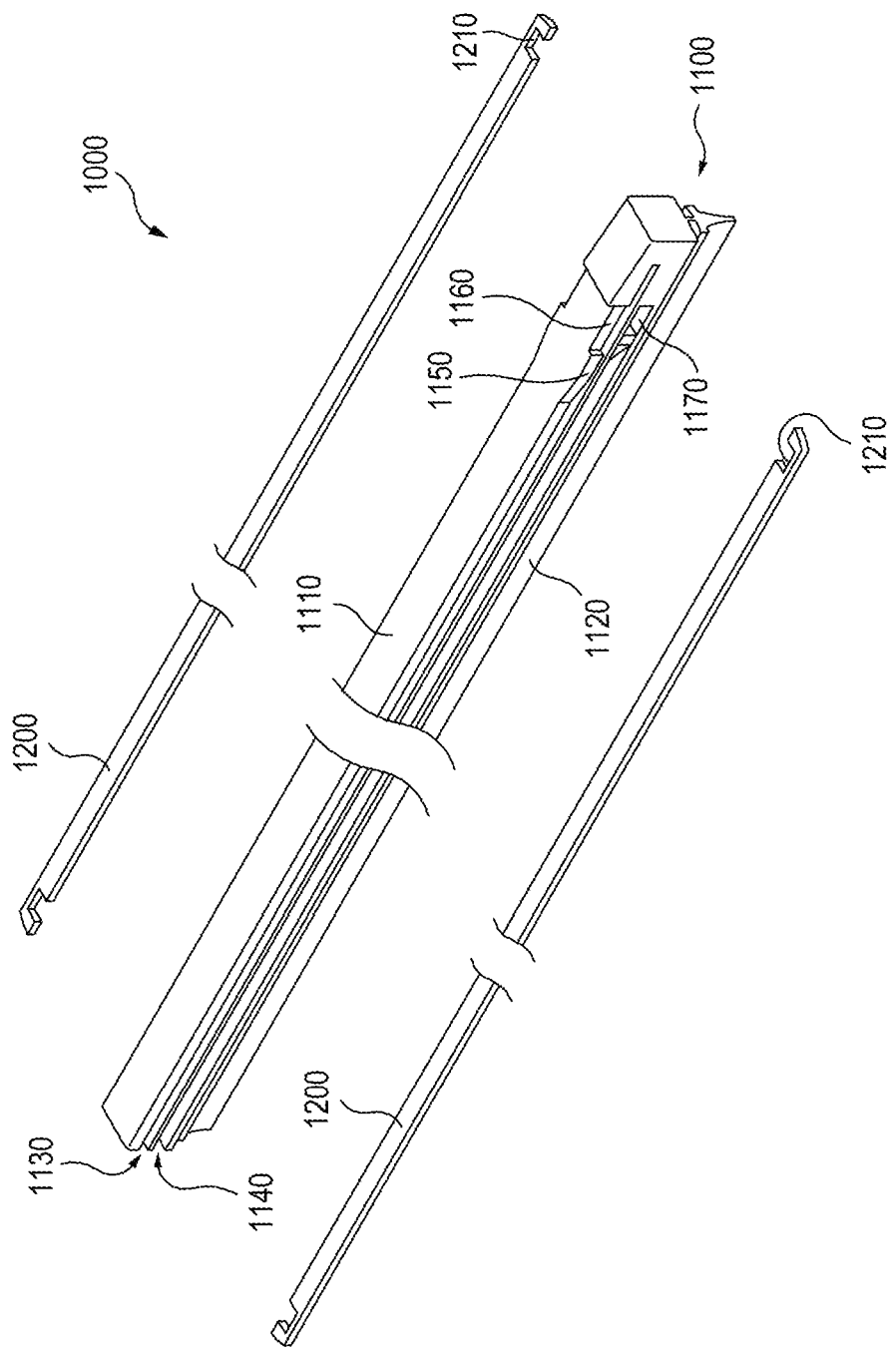
FIG. 6 is a perspective view showing a wiper rubber and spring rails constituting a wiper rubber assembly of the wiper blade according to an embodiment.
Figure 7:
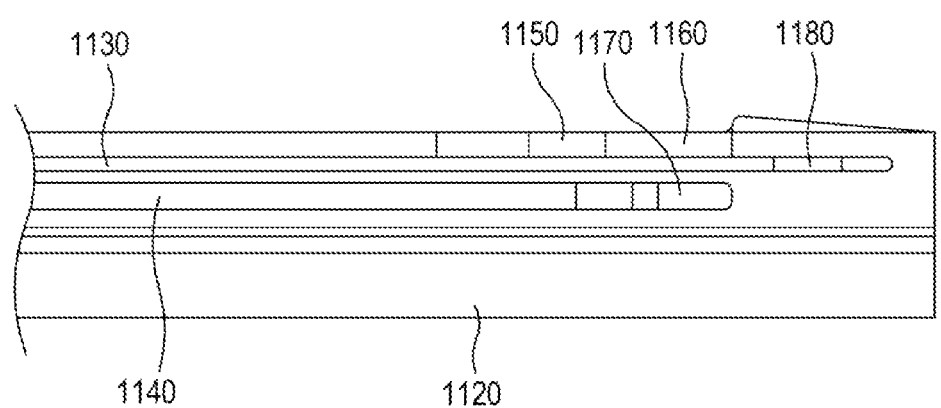
FIG. 7 is a fragmental front view of the wiper rubber shown in FIG. 6.
Figure 8:
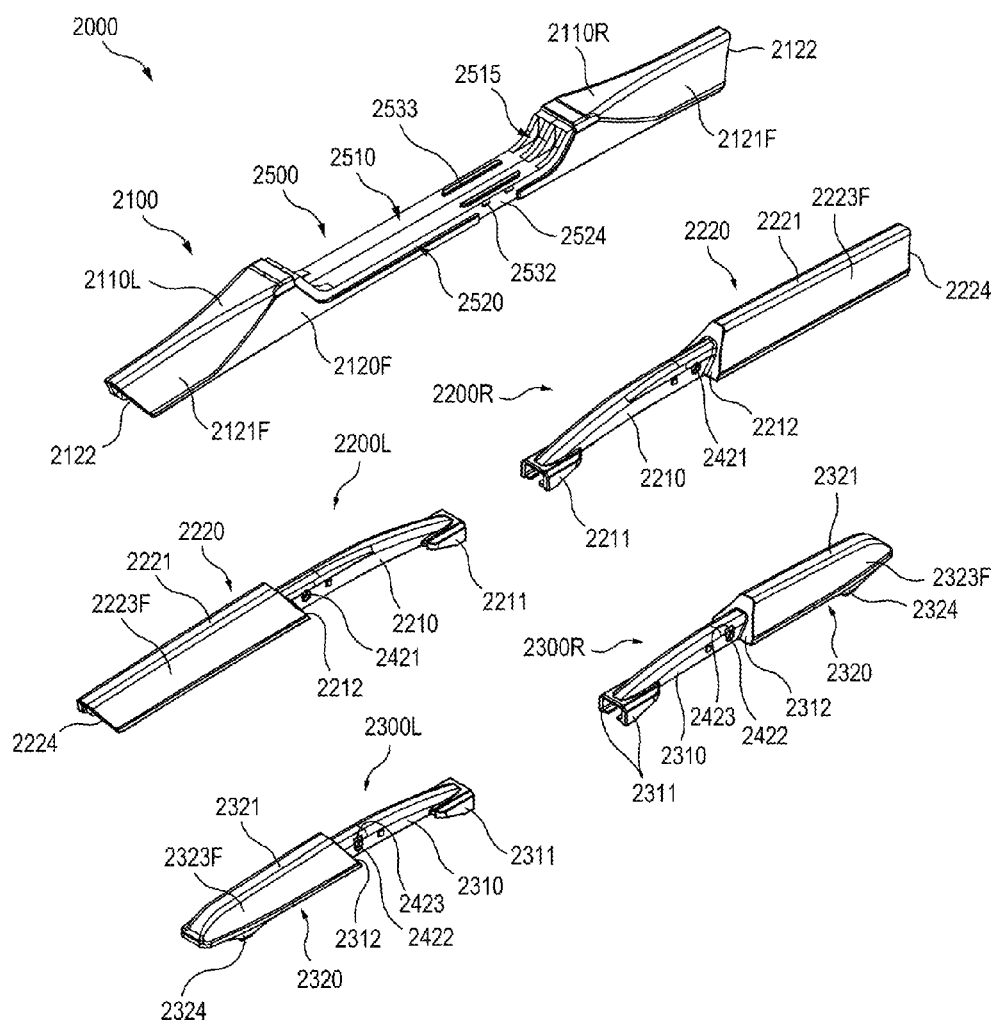
FIG. 8 is an exploded perspective view of a lever assembly of the wiper blade according to an embodiment.
Figure 9:
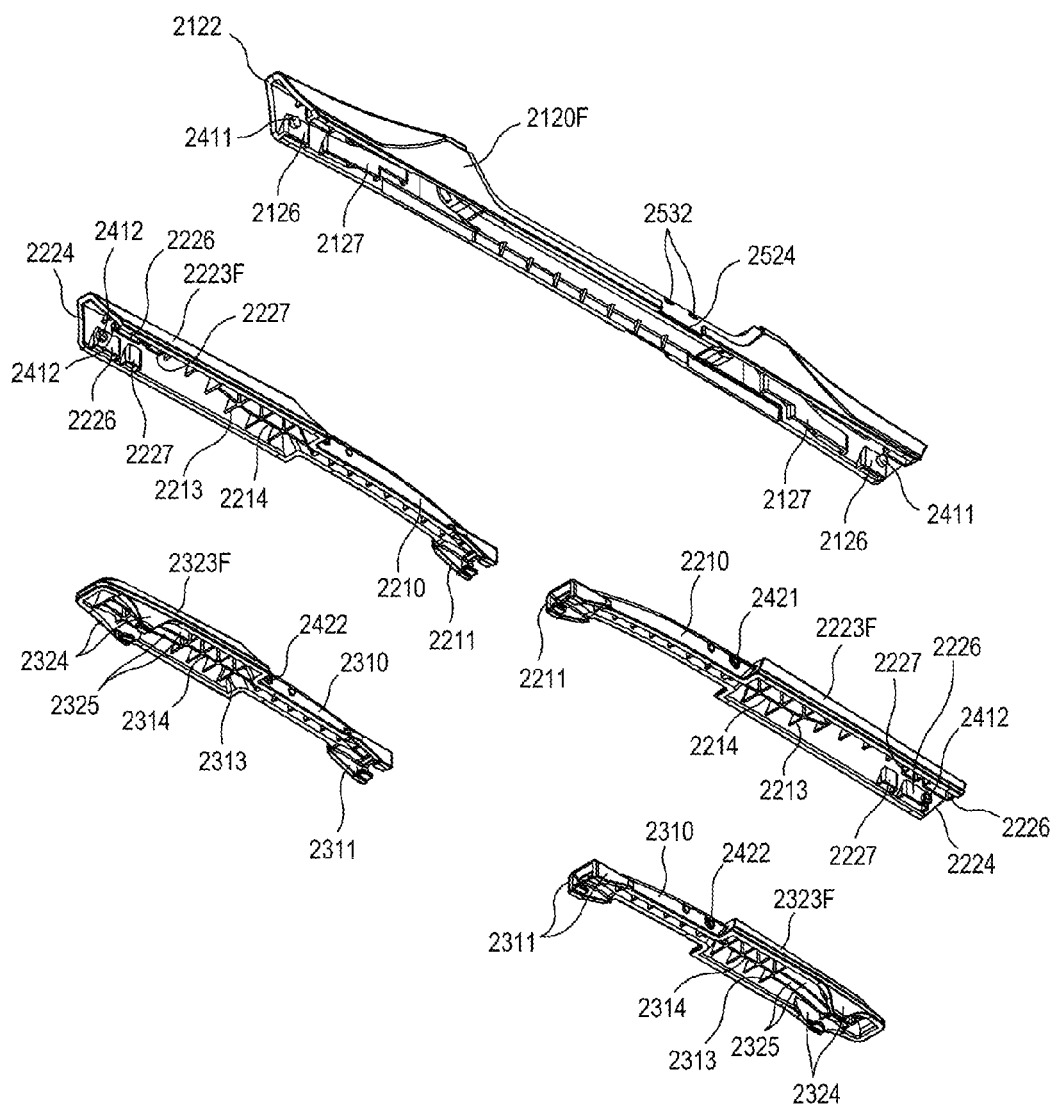
FIG. 9 is a lower perspective view of the lever assembly shown in FIG. 8.
Figure 10:
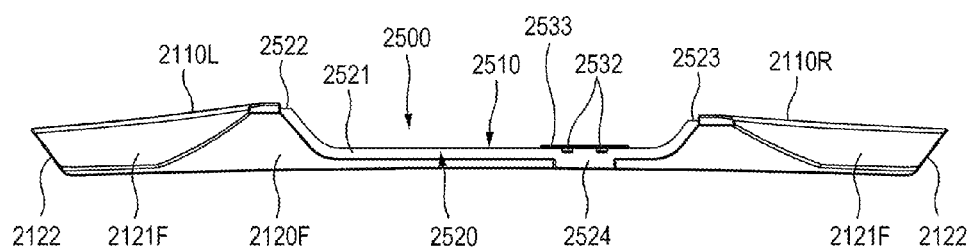
FIG. 10 is a front view of a first lever of the lever assembly shown in FIG. 8.
Figure 11:
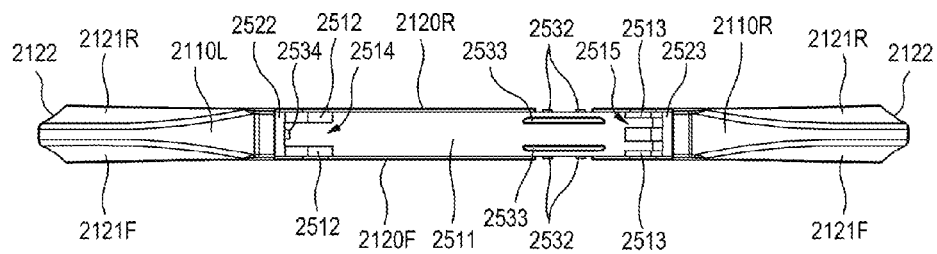
FIG. 11 is a top view of the first lever of the lever assembly shown in FIG. 8.
Figure 12:
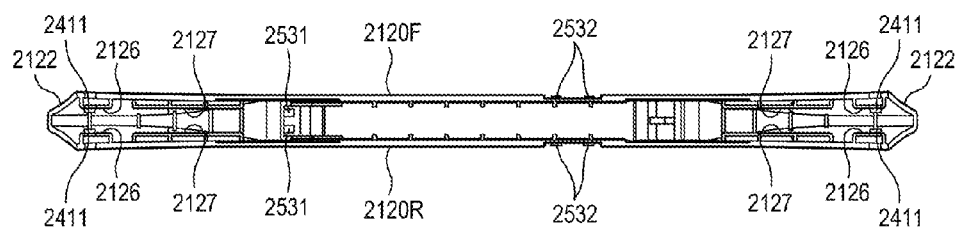
FIG. 12 is a bottom view of the first lever of the lever assembly shown in FIG. 8.
Figure 13:
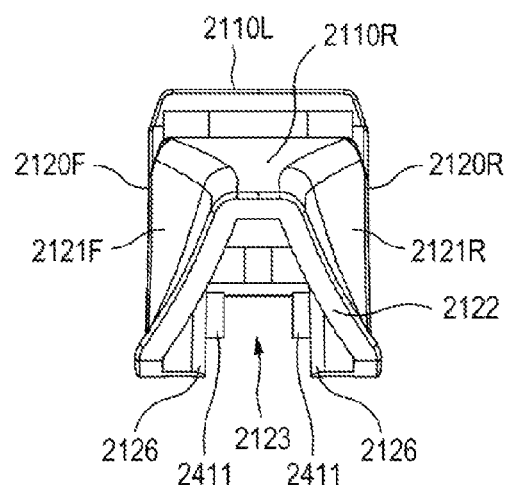
FIG. 13 is a right side view of the first lever of the lever assembly shown in FIG. 8.
Figure 14:
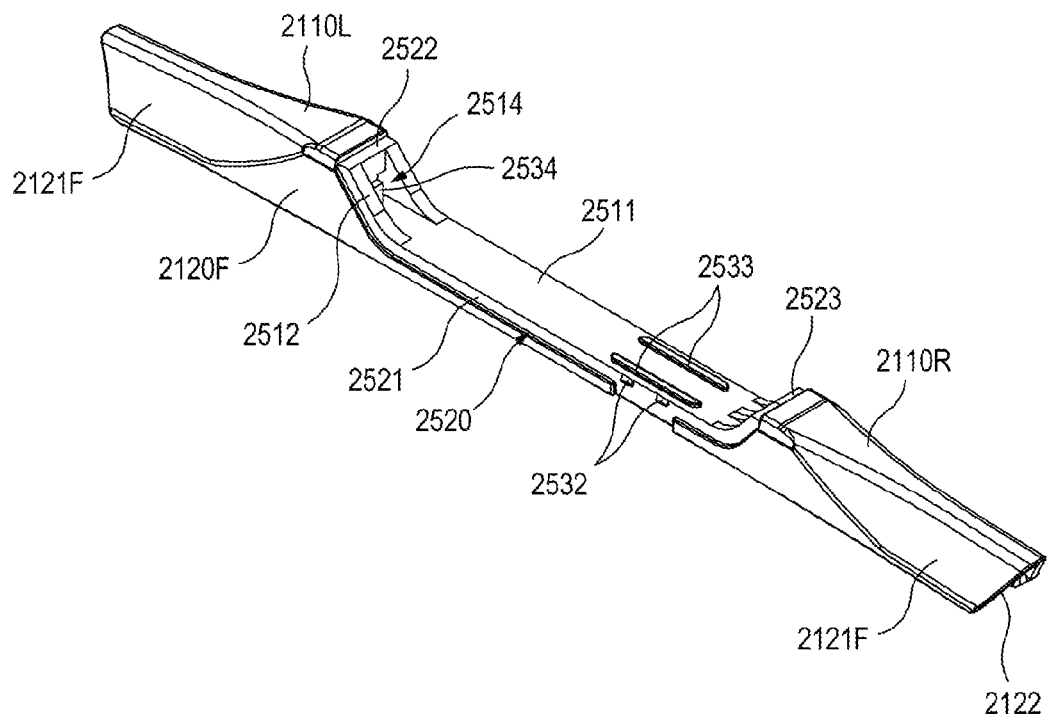
FIG. 14 is a perspective view of the first lever of the lever assembly shown in FIG. 8.
Figure 15:
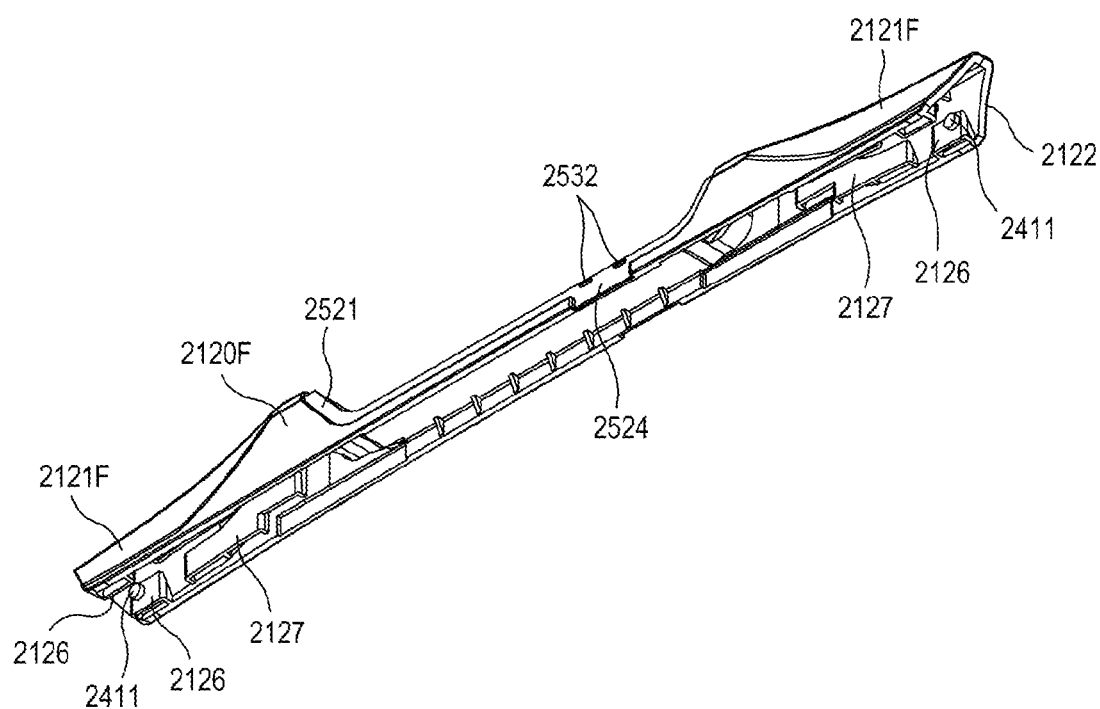
FIG. 15 is a lower perspective view of the first lever of the lever assembly shown in FIG. 8.
Figure 16:
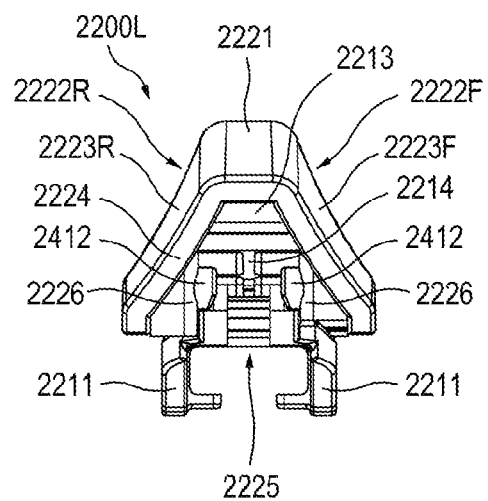
FIG. 16 is a left side view of a second lever of the lever assembly shown in FIG. 8.
Figure 17:
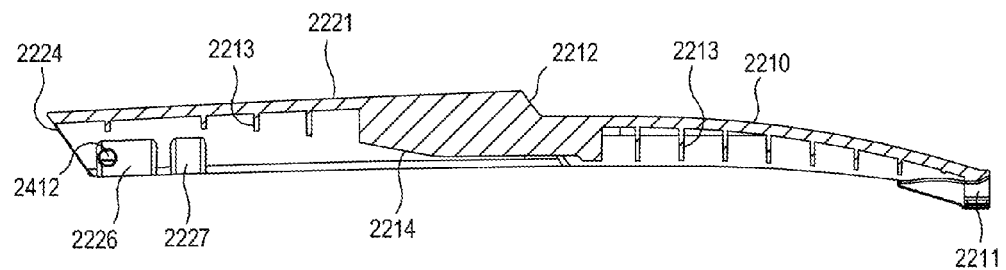
FIG. 17 is a longitudinal sectional view of a second lever of the lever assembly shown in FIG. 8.
Figure 18:
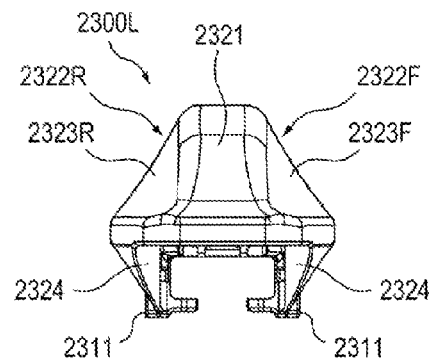
FIG. 18 is a left side view of a third lever of the lever assembly shown in FIG. 8.
Figure 19:
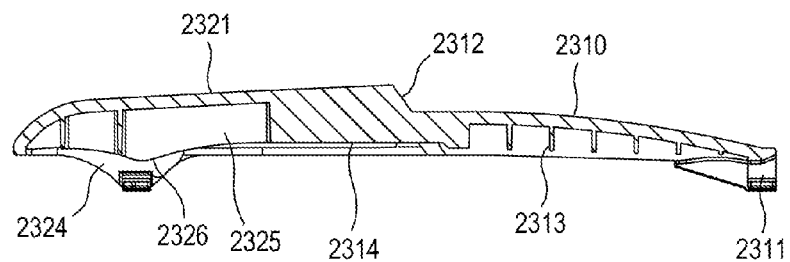
FIG. 19 is a longitudinal sectional view of the third lever of the lever assembly shown in FIG. 8.

The wiper rubber 1100 is made from a rubber or plastic material having elasticity. Referring to FIGS. 6 and 7, the wiper rubber 1100 has an elongated body portion 1110 and a wiper lip 1120 longitudinally extending under the body portion 1110 and contacting the windshield surface. Further, the wiper rubber 1100 has, at either side of the body portion 1110, two rows of grooves 1130, 1140 that extend in the longitudinal direction of the wiper rubber. A first groove 1130 extends along the body portion 1110 immediately below a top surface of the body portion 1110. A second groove 1140 extends along the body portion 1110 below the first groove 1130. The spring rails 1200 are inserted to the first grooves 1130 respectively. Fingers provided in the levers of the lever assembly 2000 are inserted to the second grooves 1140. In the vicinity of one end of the wiper rubber 1100, stoppers 1150 protrude between the top surface of the body portion 1110 and the first grooves 1130 and recesses 1160 are defined in edges of the top surface of the body portion 1110 due to the stoppers 1150. Further, insertion holes 1170, to which the tip ends of the outermost fingers among the fingers provided in the levers of the lever assembly 2000 are fitted, are formed below the recesses 1160 in the second grooves 1140 in the vicinity of one end of the second groove 1140. When the wiper rubber assembly 1000 and the lever assembly 2000 are assembled together, the tip ends of the outermost fingers are fitted to the insertion holes 1170 and the tip ends of other fingers are inserted to the second grooves 1140. Thus, the wiper rubber assembly 1000 is held by the lever assembly 2000.

The spring rails 1200 (referred to as a "vertebra" in the art) are fitted to the first grooves 1130 of the wiper rubber 1100 respectively. The spring rails 1200 distribute the pressure, which a wiper arm applies along the lever assembly 2000, along the longitudinal direction of the wiper rubber 1100. The spring rails 1200 are made from a metallic material and have a shape of a thin elongated bar. The spring rail 1200 has a notch 1210 at either end and the first groove 1130 has a protrusion 1180 corresponding to the notch 1210 therein. Some embodiments may include the spring rails 1200 that are inlaid or embedded to the body portion 1110 of the wiper rubber 1100 in the longitudinal direction.

The lever assembly 2000 holds the wiper rubber assembly 1000 (i.e., the wiper rubber 1100 with the spring rails 1200 fitted thereto) and supports the wiper rubber assembly 1000 with respect to the wiper arm. The wiper arm is connected to a rotating shaft of a wiper motor at its base end and is oscillated through the operation of the wiper motor. The wiper blade 100 is detachably attached to the distal end of the wiper arm via the connector assembly 3000, which is detachably mounted to the lever assembly 2000, and is thus connected to the wiper arm. The wiper blade 100 wipes the surface of the windshield while sliding on the surface of the windshield through oscillation motions of the wiper arm.

In this embodiment, the lever assembly 2000 includes the following: a first lever 2100 located centrally in the longitudinal direction; a pair of second levers 2200L, 2200R connected to the longitudinal outer ends of the first lever 2100 respectively; and a pair of third levers 2300L, 2300R connected to the second levers 2200L, 2200R respectively. The connector assembly 3000 for connection to the wiper arm is detachably joined to the first lever 2100. The first to third levers are formed in a linear shape and are adjoined linearly along the longitudinal direction of the wiper rubber 1100. The first to third levers have an elongated hollow shape and may be made by pressing a metallic sheet or injection-molding a plastic material. Adjacent two levers are rotatably connected to each other such that opposing end surfaces of said two levers face to each other with little gap therebetween.

When viewing the lever assembly 2000 from the top, a width of the lever assembly 2000 increases from the middle of the first lever 2100 towards the longitudinal outer ends of the first lever 2100. Further, when viewing the lever assembly 2000 from the front, the width of the lever assembly 2000 is constant in some section of the second levers 2200L, 2200R and the third levers 2300L, 2300R and decreases towards the longitudinal outer ends of the third levers 2300L, 2300R. When viewing the lever assembly 2000 from the top, front and rear halves of the lever assembly 2000 are symmetrical about a central axis of the longitudinal direction of the lever assembly. When viewing the lever assembly 2000 from the front, left and right halves of the lever assembly 2000 are symmetrical about a longitudinal center of the lever assembly except a top wall of the first lever 2100.

The lever assembly 2000 of the wiper blade 100 according to this embodiment includes a pair of spoilers 2600L, 2600R, which are integrated with the lever assembly. In this embodiment, as shown in FIGS. 4, 13, 16 and 18, the cross-sectional contour shape of the spoiler 2600L, 2600R includes a pair of concave curved lines that are symmetrical in the width direction of the lever assembly 2000. Each spoiler 2600L, 2600R comprises partial spoilers located in the first lever 2100, the second levers 2200L, 2200R and the third levers 2300L, 2300R. The partial spoilers of each lever are adjoined linearly one after another, thereby defining the spoiler 2600L, 2600R of the wiper blade 100. In the disclosure below discussing the wiper blade 100 according to the embodiment, a partial spoiler integrated in the first lever 2100 to become a part of the spoiler 2600L, 2600R is referred to as a first partial spoiler 2610L, 2610R, a partial spoiler integrated in the second lever 2200L, 2200R to become another part of the spoiler 2600L, 2600R is referred to as a second partial spoiler 2620L, 2620R, and a partial spoiler integrated in the third lever 2300L, 2300R to become yet another part of the spoiler 2600L, 2600R is referred to as a third partial spoiler 2630L, 2630R.

Referring to FIGS. 8 to 15, the first lever 2100 has a top wall 2110L, 2110R and a pair of lateral walls 2120F, 2120R. Further, a connector seat 2500 for seating the connector assembly 3000 is disposed in the middle of the first lever 2100. When viewing the first lever 2100 from the front, a bottom edge of the first lever 2100 is linear or upwardly convex with a slight curvature. Further, when viewing the first lever 2100 from the front, the height of the lateral wall 2120F, 2120R decreases from longitudinal ends of the connector seat 2500 towards the longitudinal outer ends of the first lever 2100. The end of the connector seat 2500 adjacent to the top wall 2110L is higher than the opposite end of the connector seat 2500 adjacent to the top wall 2110R. Further, when viewing the first lever 2100 from the top or the bottom, the midway width of the first lever 2100 is narrower than the width of the longitudinal outer ends. In another example of the first lever 2100, the height of the end of the connector seat 2500 adjacent to the top wall 2110L and the height of the opposite end of the connector seat 2500 adjacent to the top wall 2110R are the same. Further, the midway width the first lever 2100 is the same as or broader than the width of the longitudinal outer ends.

The first lever 2100 has a pair of first inclined surfaces 2121F, 2121R in the left lateral walls and the right lateral walls. The first inclined surfaces 2121F, 2121R extend from the vicinity of the longitudinal end of the connector seat 2500 up to the longitudinal outer end of the first lever 2100 and are inclined inwardly of the first lever 2100 in the width direction of the first lever 2100. Thus, when viewing the first lever 2100 from the side, the lateral walls of the first lever 2100 have an inverted V-shaped cross-section. The first partial spoiler 2610L, 2610R is integrated in the first lever 2100 through the first inclined surfaces 2121F, 2121R. The width of the top wall 2110L, 2110R becomes sharply narrow from the connector seat 2500 and is then constant. The first inclined surfaces 2121F, 2121R are concave in harmony with such a width of the top wall 2110L, 2110R. Thus, the cross-sectional contour shape of the first partial spoiler 2610L, 2610R, which the first inclined surfaces 2121F, 2121R define, includes a pair of concave curved lines that are symmetrical in the width direction of the first lever 2100.

The first lever 2100 has an arm receiving portion 2123 that receives a portion of the second lever 2200L, 2200R and hides the same therein. The arm receiving portion 2123 is defined by a space between the first inclined surfaces 2121F, 2121R. An end surface 2122 is formed at either longitudinal outer end of the first lever 2100. When viewing the first lever 2100 from the front, the end surface 2122 is inclined at an acute angle with respect to the top edge of the first lever and at an obtuse angle with respect to the bottom edge of the first lever, i.e., towards the longitudinal outer end of the lever assembly 2000 (towards a longitudinal outer end of the third lever 2300L, 2300R).

The connector seat 2500 is integrally provided in the first lever 2100 between the pair of the first inclined surfaces 2121F, 2121R located left in the first lever 2100 and the pair of the first inclined surfaces 2121F, 2121R located right in the first lever 2100. The connector seat 2500 is configured such that a bracket 3100 constituting the base of the connector assembly is seated on the connector seat and is fixed to the connector seat. The connector seat 2500 includes a seat surface 2510, on which the bracket 3100 is seated. Further, the connector seat 2500 includes a stepped surface 2520 separating the seat surface 2510 from the first lever 2100. The stepped surface 2520 is formed along the periphery of the seat surface 2510. Thus, due to the stepped surface 2520, the seat surface 2510 is located lower than the top walls 2110L, 2110R of the first lever and more inward than the lateral walls 2120F, 2120R of the first lever. Accordingly, the bracket 3100 of the connector assembly 3000 is coupled to the first lever 2100 in such a way that the bracket 3100 is seated on the seat surface 2510 and is positioned and retained by the stepped surface 2520.

In this embodiment, the seat surface 2510 of the connector seat is so shaped that the seat surface is sunken from the top wall 2110L, 2110R towards the lateral wall 2120F, 2120R at a certain depth. When viewing the first lever 2100 from the front, the seat surface 2510 has an elongated U shape. The stepped surface 2520 extends along the periphery of the seat surface 2510. Thus, the seat surface 2510 is separated from the top wall 2110L, 2110R and the lateral walls 2120F, 2120R via the stepped surface 2520.

The seat surface 2510 comprises a longitudinally-extending flat surface 2511 and first and second inclined surfaces 2512, 2513 extending from longitudinal ends of the flat surface 2511 respectively. The flat surface 2511 is located lower than the top edge of the first lever 2100 (the top wall 2110L 2110R). The first inclined surface 2512 and the second inclined surface 2513 are inclined at the same angle towards the longitudinal outer end of the first lever 2100 relative to the flat surface 2511.

The stepped surface 2520 comprises: a lateral stepped surface 2521, which extends alongside the flat surface 2511 and the first and second inclined surfaces 2512, 2513 and adjoins lateral edges of the flat surface 2511 and the first and second inclined surfaces 2512, 2513; and a first top stepped surface 2522 and a second top stepped surface 2523, which extends alongside top ends of the first and second inclined surfaces 2512, 2513 and adjoin the top ends of the first and second inclined surfaces 2512, 2513 respectively. When viewing the first lever 2100 from the front, the lateral stepped surface 2521 has an elongated U shape. The first and second top stepped surfaces 2522, 2523 are located at a certain depth below apex points of the top walls 2100L, 2110R of the first lever and the lateral stepped surface 2521 is located at a certain depth more inward than the lateral walls 2120F, 2120R of the first lever. Further, the connector seat 2500 includes an auxiliary stepped surface 2524 continued to the stepped surface 2520. The auxiliary stepped surface 2524 is formed adjacent to the second inclined surface 2513 between the lateral stepped surface 2521 and the bottom edge of the lateral wall 2120F, 2120R. Thus, the lateral wall 2120F, 2120R has a reduced thickness at the auxiliary stepped surface 2524.

The connector seat 2500 has recesses in the first and second inclined surfaces 2512, 2513 of the seat surface. Portions of the bracket are inserted to the recesses. The recesses are approximately L-shaped when viewing the first lever 2100 from the front. A first recess 2514, which is concave towards the longitudinal outer end of the first lever 2100, is formed in the first inclined surface 2512 and a pair of second recesses 2515, which are concave towards the longitudinal outer end of the first lever 2100, are formed in the second inclined surface 2513.

The connector seat 2500 includes a pair of insertion slots 2531 in the first recess 2514, which is located at the longitudinal outer end of the seat surface 2510. Insertion protrusions provided in the bracket 3100 are fitted to the insertion slots 2531. As to the stepped surface 2520, the first top stepped surface 2522 adjacent to the insertion slots 2531 is higher than the second top stepped surface 2523 located opposite the insertion slots 2531. Further, the connector seat 2500 includes a pair of snap protrusions 2532 at lateral edges of the flat surface 2511 of the seat surface. In this embodiment, the connector seat 2500 includes two pairs of snap protrusions 2532 and each snap protrusion in each pair is located in each lateral edge of the flat surface 2511. The snap protrusions 2532 are apart from the insertion slots 2531 and are located on the lateral stepped surface 2521 adjacent to the flat surface 2511. The snap protrusions 2532 are located above the auxiliary stepped surface 2524 and protrude in the width direction orthogonal to the longitudinal direction of the seat surface 2510. The snap protrusions 2532 snap-engage corresponding snap slots of the bracket 3100 of the connector assembly 3000, thereby fixing the connector assembly 3000 to the connector seat 2500. Further, the connector seat 2500 includes a pair of positioning ridges 2533 protruding on the flat surface 2511 of the seat surface. The positioning ridges 2533 are formed parallel to the auxiliary stepped surface 2524 and are fitted to positioning slots of the bracket 3100 of the connector assembly 3000. Further, the connector seat 2500 includes an insertion protrusion 2534 protruding between the pair of insertion slots 2531. The insertion protrusion 2534 is inserted into between the insertion protrusions of the bracket 3100 of the connector assembly 3000.

The second levers 2200L, 2200R are rotatably connected to the first lever 2100 respectively and holds the wiper rubber assembly 1000. Descriptions are made as to the second lever 2200L with reference to FIGS. 8, 9, 16 and 17.

The second lever 2200L, 2200R includes an arm portion 2210 and a spoiler portion 2220. When the first lever 2100 and the second lever 2200L, 2200R are assembled together, the arm portion 2210 is situated in the arm receiving portion 2123 of the first lever 2100. The spoiler portion 2220 extends from a longitudinal outer end of the arm portion 2210 towards the longitudinal outer end of the lever assembly 2000. The arm portion 2210 has an inverted U-shaped cross-section and the spoiler portion 2220 has an inverted V-shaped cross-section. Bottom edges of the arm portion 2210 and the spoiler portion 2220 form an approximately straight line or a concave curved line with slight curvature.

A stepped surface 2212, which is opposite the end surface 2122 of the first lever 2100, is formed at the boundary of the arm portion 2210 and the spoiler portion 2220. The stepped surface 2212 is inclined towards the longitudinal outer end of the lever assembly 2000 (the longitudinal outer end of the third lever 2300L, 2300R) at the same angle as the inclination angle of the end surface 2122 of the first lever 2100 or at an angle less than that. Further, the second lever 2200L, 2200R has an end surface 2224 at the longitudinal outer end thereof, i.e., the longitudinal outer end of the spoiler portion 2220. The end surface 2224 of the second lever 2200L, 2200R is inclined towards the longitudinal outer end of the lever assembly 2000 (the longitudinal outer end of the third lever 2300L, 2300R) at the same angle as the inclination angle of the end surface 2122 of the first lever or at an angle less than that.

Each second lever 2200L, 2200R has, at the longitudinal outer end of the arm portion 2210, a pair of fingers 2211 for grasping the wiper rubber assembly 1000. When viewing the second lever 2200L, 2200R from the side, the finger 2211 has an L shape. When assembling the second lever 2200L, 2200R and the wiper rubber assembly 1000, the tip ends of the fingers 2211 are inserted to the second grooves 1140 of the wiper rubber 1100 along the second grooves 1140. When the fingers 2211 are fitted to the wiper rubber 1100, the spring rail 1200 and a portion of the wiper rubber 1100 adjacent thereto are sandwiched between the fingers 2211 and the under surface of the arm portion 2210 located above the fingers 2211.

The spoiler portion 2220 has a top wall 2221 and a pair of lateral walls 2222F, 2222R. The spoiler portion 2220 has a pair of second inclined surfaces 2223F, 2223R in the lateral walls thereof. The second inclined surface 2223F, 2223R extends from the stepped surface 2212 up to the longitudinal outer end of the spoiler portion 2220 (i.e., up to the end surface 2224) and is inclined inwardly of the spoiler portion 2220 in the width direction of the spoiler portion 2220. The second partial spoiler 2620L, 2620R is integrated in the spoiler portion 2220 through the second inclined surfaces 2223F, 2223R. The width of the top wall 2221 is constant from the longitudinal inner end (the stepped surface 2212) to the longitudinal outer end (the end surface 2224). The cross-sectional contour shape of the second partial spoiler 2620L, 2620R, which the second inclined surfaces 2223F, 2223R define, includes a pair of concave curved lines that are symmetrical in the width direction of the spoiler portion 2220 (in the width direction of the second lever 2200L, 2200R).

The spoiler portion 2220 has an arm receiving portion 2225 that receives a portion of the third lever 2300L, 2300R and hides the same therein. The arm receiving portion 2225 is defined by a space between the second inclined surfaces 2223F, 2223R. The second lever 2200L, 2200R has a plurality of transverse ribs 2213 and a longitudinal rib 2214 therein. The transverse ribs 2213 are oriented in the width direction. The longitudinal rib 2214 is oriented in the longitudinal direction and intersects the transverse ribs 2213. The transverse ribs 2213 and the longitudinal rib 2214 are located in the arm portion 2210 as well as the spoiler portion 2220. Further, the transverse ribs 2213 and the longitudinal rib 2214 protrude such that they do not interfere with a portion of the third lever 2300L, 2300R.

The first lever 2100 and the second lever 2200L, 2200R are rotatably connected to each other through hinge-connection between the inside of the lateral walls 2120F, 2120R of the first lever and the outside of the arm portion 2210 of the second lever. When the first lever 2100 and the second lever 2200L, 2200R are connected, the arm portion 2210 of the second lever is situated in the arm receiving portion 2123 of the lateral walls 2120F, 2120R of the first lever 2100 and is thus hidden within the first lever 2100 when viewed from outside. In this embodiment, the hinge-connection portion configured to rotatably interconnect the first lever 2100 and the second levers 2200L, 2200R comprises: a pair of fitting protrusions 2411 disposed in the arm receiving portion 2123 of the first lever 2100; and a pair of fitting holes 2421, which are disposed in the arm portion 2210 of the second lever 2200L, 2200R, and to which the fitting protrusions 2411 are fitted respectively.

The first lever 2100 has, at the left and right thereof, two pairs of contact surfaces 2126, 2127 so that the second lever 2200L, 2200R hinge-joined to the first lever can be retained relative to the first lever 2100 without shake. The contact surfaces 2126, 2127 can contact the arm portion 2210 of the second lever in the width direction. The contact surfaces 2126, 2127 of each pair are located at the bottom edges of the inner surfaces of the lateral walls 2120F, 2120R. The contact surfaces 2126, 2127 of each pair are opposite each other and are raised inwardly of the first lever 2100. The fitting protrusion 2411 protrude from the contact surface 2126 inwardly of the first lever 2100 in the width direction of the first lever 2100. When the first lever 2100 and the second lever 2200L, 2200R are connected to each other, the arm portion 2210 is inserted into between the contact surfaces 2126, 2127 of each pair. Spacing between the contact surfaces 2126, 2127 of each pair is almost equal to or somewhat greater than the width of the arm portion 2210.

The fitting holes 2421 may be perforated through the lateral portions of the arm portion 2210 or be formed at a predetermined depth in the width direction of the second lever 2200L, 2200R. The fitting holes 2421 are located apart from the stepped surface 2212 of the second lever by the spacing between the end surface 2122 of the first lever and the fitting protrusion 2411.

The third levers 2300L, 2300R are rotatably connected to the second levers 2200L, 2200R respectively and hold the wiper rubber assembly 1000. Descriptions are made as to the third lever 2300L with reference to FIGS. 8, 9, 18 and 19. The third lever 2300L, 2300R includes an arm portion 2310 and a spoiler portion 2320. When the second lever 2200L, 2200R and the third lever 2300L, 2300R are assembled together, the arm portion 2310 is situated in the arm receiving portion 2225 of the second lever. The spoiler portion 2320 extends from a longitudinal outer end of the arm portion 2310 towards the longitudinal outer end of the lever assembly 2000. The arm portion 2310 has an inverted U-shaped cross-section and the spoiler portion 2320 has an inverted V-shaped cross-section. Bottom edges of the arm portion 2310 and the spoiler portion 2320 form an approximately straight line.

A stepped surface 2312, which is opposite the end surface 2224 of the second lever 2200L, 2200R, is formed at the boundary of the arm portion 2310 and the spoiler portion 2320. The stepped surface 2312 is inclined towards the longitudinal outer end of the lever assembly 2000 (the longitudinal outer end of the third lever 2300L, 2300R) at the same angle as the inclination angle of the end surface 2224 of the second lever or at an angle less than that.

Each third lever 2300L, 2300R has two pairs of fingers 2324, 2311 for grasping the wiper rubber assembly 1000. Longitudinal inner fingers 2311 are formed at a longitudinal inner end of the arm portion 2310. The fingers 2311 have the same configuration as the fingers 2211 of the second lever. Longitudinal outer fingers 2324 are formed at a bottom edge of the spoiler portion 2320 in the vicinity of a longitudinal outer end thereof. The fingers 2324 extend from the bottom edge of the spoiler portion 2320 in an L shape. When assembling the third lever 2300L, 2300R and the wiper rubber assembly 1000, the tip ends of the fingers 2311, 2324 are inserted to the second grooves 1140 of the wiper rubber 1100. A pair of longitudinally extending ribs 2325 are formed in the inside of the spoiler portion 2320 in which the fingers 2324 are provided. The portions of the ribs 2325, which are located above the tip ends of the fingers 2324 protrude downwardly to form a pressing portion 2326. When the lever assembly 2000 and the wiper rubber assembly 1000 are assembled together, the pressing portion 2326 presses the top surface of the body portion 1110 of the wiper rubber 1100 downwardly (towards the tip ends of the fingers 2324) or is placed on the top surface of the body portion 1110 of the wiper rubber 1100 with little gap. Thus, the fingers 2324 firmly clamp the wiper rubber 1100 by the pressing portion 2326.

The spoiler portion 2320 has a top wall 2321 and a pair of lateral walls 2322F, 2322R. The spoiler portion 2320 has a pair of third inclined surfaces 2323F, 2323R in the lateral walls thereof. The third inclined surface 2323F, 2323R extends from the stepped surface 2312 up to the longitudinal outer end of the spoiler portion 2320 and is inclined inwardly of the spoiler portion 2320 in the width direction of the spoiler portion 2320. The third partial spoiler 2630L, 2630R is integrated in the spoiler portion 2320 through the third inclined surfaces 2323F, 2323R. The width of the top wall 2321 is constant from the longitudinal inner end (the stepped surface 2312) up to the longitudinal outer end. The cross-sectional contour shape of the third partial spoiler 2630L, 2630R, which the third inclined surfaces 2323F, 2323R define, includes a pair of concave curved lines that are symmetrical in the width direction of the spoiler portion 2320 (in the width direction of the third lever 2300L, 2300R). Further, the height of the third inclined surfaces 2323F, 2323R decreases towards the longitudinal outer end of the third lever 2300L, 2300R. Further, the third inclined surfaces 2323F, 2323R may be curved with the same curvature as that of the second inclined surfaces 2223F, 2223R of the second lever 2200L, 2200R, or curved with a curvature varying therefrom. In this embodiment, the third inclined surfaces 2323F, 2323R of the third lever 2300L, 2300R are curved with the curvature greater than that of the second inclined surfaces 2223F, 2223R at the end surface 2224 of the second lever. Further, bottom edges of the third inclined surfaces 2323F, 2323R approach each other at the longitudinal outer end of the third lever 2300L, 2300R, thus forming a round outer end of the lever assembly 2000 together with the top wall 2310.

The third lever 2300L, 2300R has a plurality of transverse ribs 2313 and a longitudinal rib 2314 therein. The transverse ribs 2313 are oriented in the width direction. The longitudinal rib 2314 is oriented in the longitudinal direction and intersects the transverse ribs 2313. The transverse ribs 2313 and the longitudinal rib 2314 are located in the arm portion 2310 as well as the spoiler portion 2320.

The second lever 2200L, 2200R and the third lever 2300L, 2300R are rotatably connected to each other through hinge-connection between the inside of the lateral walls 2222F, 2222R of the second lever and the outside of the arm portion 2310 of the third lever. When the second lever 2200L, 2200R and the third lever 2300L, 2300R are connected, the arm portion 2310 of the third lever is situated in the arm receiving portion 2225, which is located in the lateral walls 2222F, 2222R of the second lever 2200L, 2200R, and is thus hidden within the second lever 2200L, 2200R when viewed from outside. In this embodiment, the hinge-connection portion configured to rotatably interconnect the second lever 2200L, 2200R and the third lever 2300L, 2300R comprises: a pair of fitting protrusions 2412 disposed in the arm receiving portion 2225 of the spoiler portion 2220 of the second lever; and a pair of fitting holes 2422, which are disposed in the arm portion 2310 of the third lever, and to which the fitting protrusions 2412 are fitted respectively.

The second lever 2200L, 2200R has two pairs of contact surfaces 2226, 2227 so that the third lever 2300L, 2300R hinge-joined to the second lever can be retained relative to the second lever 2200L, 2200R without shake. The contact surfaces 2226, 2227 can contact the arm portion 2310 of the third lever in the width direction. The contact surfaces 2226, 2227 of each pair are located opposite each other in the inner surface of the spoiler portion 2220 of the second lever and are raised inwardly of the second lever. The fitting protrusion 2412 protrude from the contact surface 2226 inwardly of the second lever in the width direction of the second lever. The fitting protrusions 2412 have a beveled surface at a lower portion of a tip end thereof to facilitate fitting to the fitting holes 2422. When the second 2200L, 2200R and the third lever 2300L, 2300R are connected to each other, the arm portion 2310 of the third lever is inserted or fitted into between the contact surfaces 2226, 2227 of each pair. Spacing between the contact surfaces 2226, 2227 of each pair is almost equal to or somewhat greater than the width of the arm portion 2310 of the third lever.

The fitting holes 2422 may be perforated through the lateral portions of the arm portion 2310 or be formed at a predetermined depth in the width direction of the third lever 2300L, 2300R. The fitting holes 2422 are apart from the stepped surface 2312 of the third lever by the spacing between the end surface 2224 of the second lever and the fitting protrusion 2412. Guide grooves 2423 for guiding the insertion of the fitting protrusions 2412 are formed from a top surface of the arm portion 2310 of the third lever to the fitting holes 2422 respectively.

Figure 20:
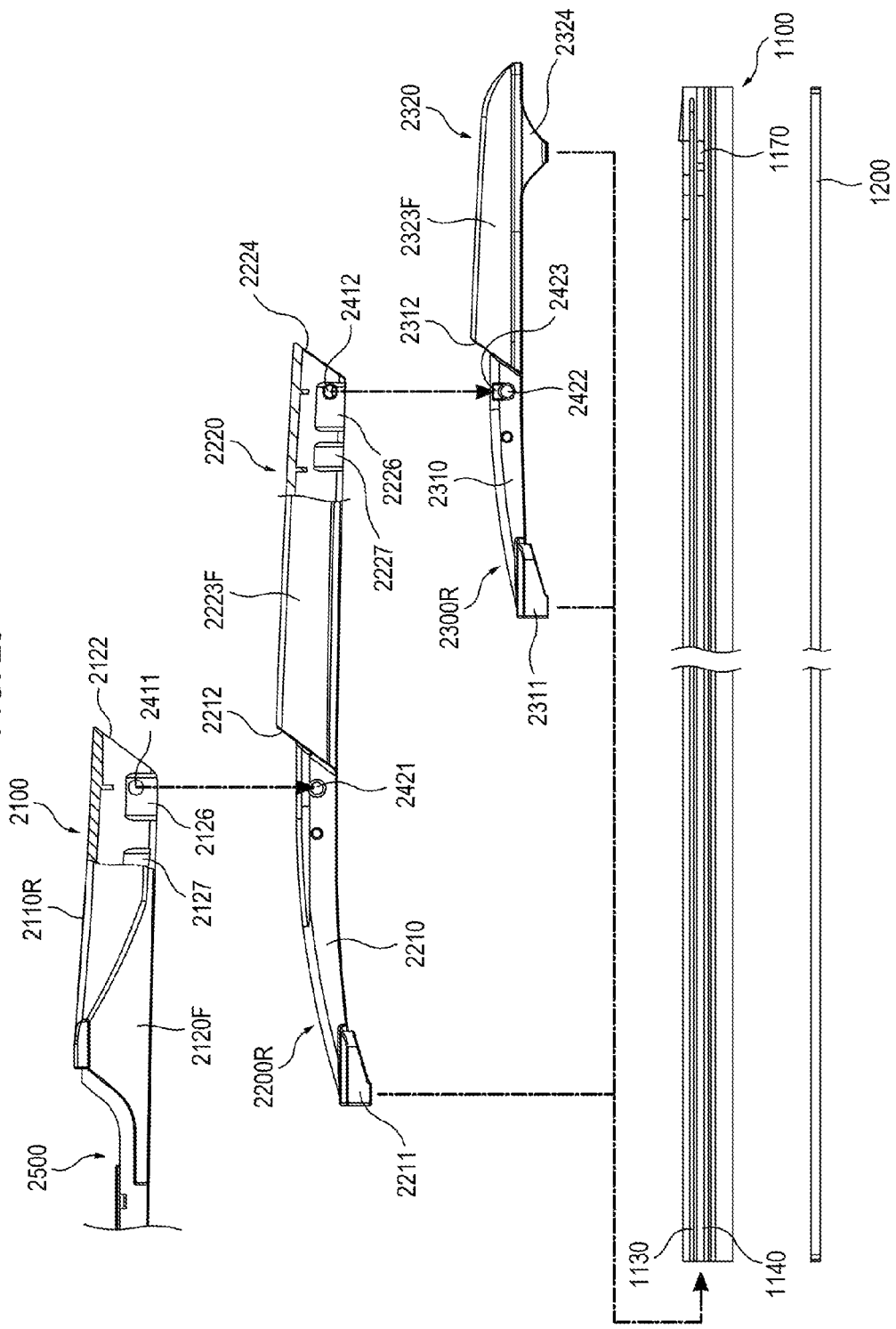
FIG. 20 shows an assembly example of the lever assembly.
Figure 21:
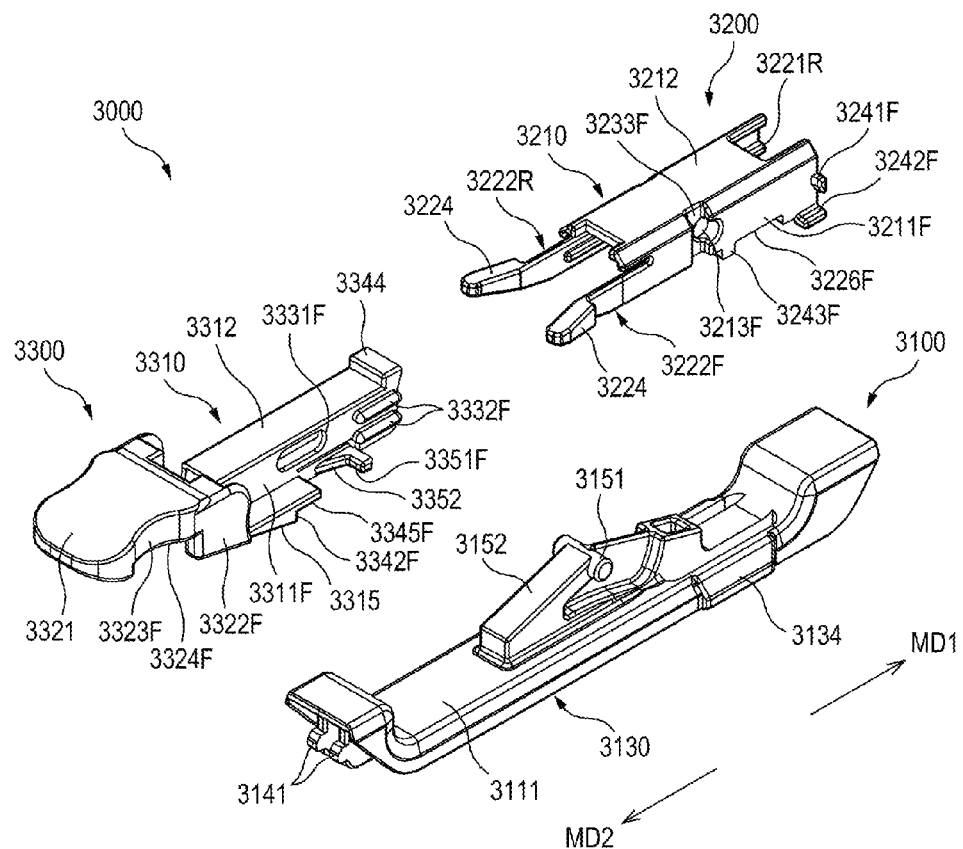
FIG. 21 is an exploded perspective view of a connector assembly of the wiper blade according to an embodiment.
Figure 22:
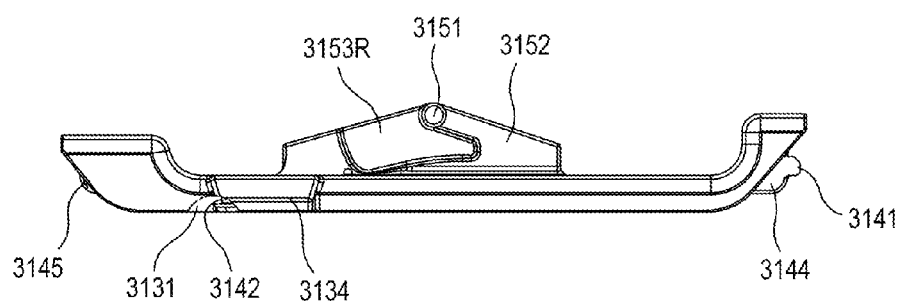
FIG. 22 is a rear view of a bracket of the connector assembly shown in FIG. 21.
Figure 23:
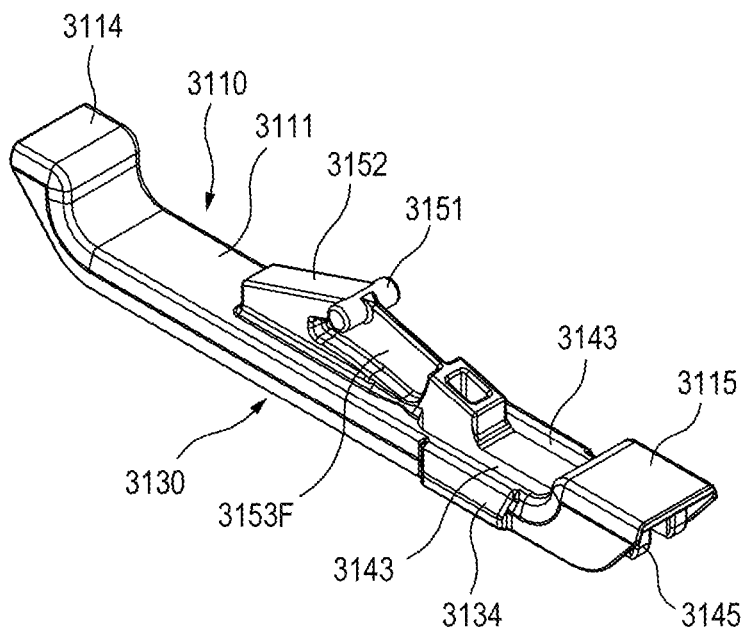
FIG. 23 is a perspective view of the bracket of the connector assembly shown in FIG. 21.
Figure 24:
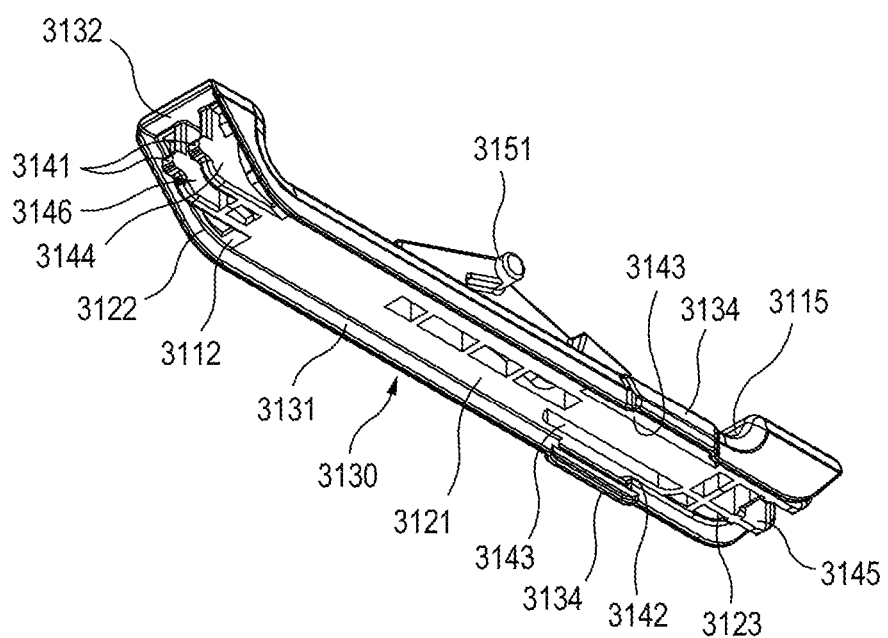
FIG. 24 is a lower perspective view of the bracket of the connector assembly shown in FIG. 21.
Figure 25:
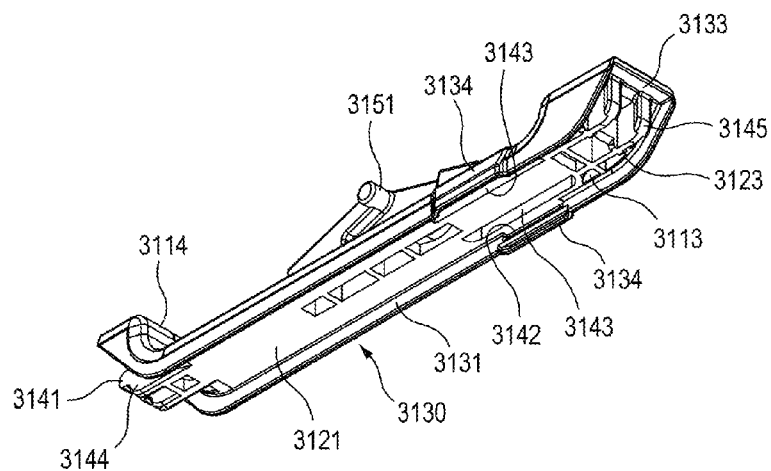
FIG. 25 is a lower perspective view of the bracket of the connector assembly shown in FIG. 21.

Descriptions are made as to an assembly example of the lever assembly 2000 and an assembly example of the wiper rubber assembly 1000 and the lever assembly 2000 with reference to FIG. 20.

The end surface 2122 located at the longitudinal outer end of first lever 2100 and the stepped surface 2212 of the second lever 2200L, 2200R are approached to each other and one of the first and second levers is pressed towards the other of the first and second levers. Then, the fitting protrusions 2411 of the first lever 2100 enter the fitting holes 2421 of the arm portion 2210 of the second lever 2200R while pressing or pinching an upper portion of the arm portion 2210. Subsequently, the fitting protrusions 2411 are fitted to the fitting holes 2421 through snap-engagement manner, thereby hinge-joining the first lever 2100 and the second lever 2200R to each other. If the first lever 2100 and the second lever 2200R are connected to each other, a portion of the arm portion 2210 of the second lever adjacent to the fitting hole 2421 and another portion located further inward than said portion are sandwiched between the contact surfaces 2126 as well as between the contact surfaces 2127. The second lever 2200R and the third lever 2300R are connected to each other in the above-described manner. That is, the end surface 2224 of the second lever 2200R and the stepped surface 2312 of the third lever 2300R are approached to each other and one of the second and third levers is pressed towards the other of the second and third levers. Then, the fitting protrusions 2412 of the second lever 2200R are fitted to the fitting holes 2422 of the arm portion 2310 of the third lever 2300R through snap-engagement manner, thereby hinge-joining the second lever 2200R and the third lever 2300R to each other. Hinge-connection between the first lever 2100 and the second lever 2200L and hinge-connection between the second lever 2200L and the third lever 2300L are made in the same manner as the above-described manner.

By fitting the fingers 2324, 2311 of the third levers 2300L, 2300R and the fingers 2211 of the second levers 2200L, 2200R to the second groove 1140 of the wiper rubber 1100, the wiper rubber assembly 1000 and the lever assembly 2000 are assembled together. For example, the fingers 2324, 2311 of the third lever 2300R, the fingers 2211 of the second lever 2200R, the fingers 2211 of the second lever 2200L and the fingers 2311, 2324 of the third lever 2300L are inserted to the second grooves 1140 of the wiper rubber one after another while sliding the wiper rubber assembly 1000 along the lever assembly 2000. If the tip ends of the fingers 2324 of the third lever 2300R are fitted to the insertion holes 1170, then the wiper rubber assembly 1000 is fixed to the lever assembly 2000.

Referring again to FIGS. 1 to 3 showing the assembled wiper blade 100, the lever assembly 2000 holds and supports the wiper rubber assembly 1000 at six pressure points by means of the fingers 2324, 2311 and the fingers 2211. Further, the first lever 2100, the second levers 2200L, 2200R and the third levers 2300L, 2300R are arranged linearly along the longitudinal direction of the wiper rubber 1100 and are at the same height on the wiper rubber 1100. Further, in the assembled wiper blade 100, the first inclined surfaces 2121F, 2121R of the first lever, the second inclined surfaces 2223F, 2223R of the second lever and the third inclined surfaces 2323F, 2323R of the third lever are adjoined linearly one after another, thereby defining the spoiler 2600L, 2600R, which has the cross-sectional contour shape varying along the longitudinal direction of the lever assembly 2000 and has a decreasing height dimension. The end surface 2122 of the first lever 2100, the stepped surface 2122 and the end surface 2224 of the second lever 2200L, 2200R and the stepped surface 2312 of the third lever 2300L, 2300R are inclined towards the longitudinal outer end of the lever assembly 2000 at an acute angle relative to the top and bottom edges of the lever assembly 2000. Further, the end surface 2122 of the first lever 2100 and the stepped surface 2212 of the second lever 2200L, 2200R have a slight play therebetween and the end surface 2224 of the second lever 2200L, 2200R and the stepped surface 2312 of the third lever 2300L, 2300R have a slight play therebetween. The second lever 2200L, 2200R and the third lever 2300L, 2300R can rotate upwardly relative to the first lever 2100 to a little extent. In contrast, when a downward load acts on the wiper blade 100, the lever assembly 2000 can bring the wiper rubber assembly 1000 into strong contact with the windshield. Further, the stepped surface 2212 of the second lever is inclined at an angle less than the end surface 2122 of the first lever, and the stepped surface 2312 of the third lever is inclined at an angle less than the end surface 2224 of the second lever. Accordingly, when a downward load acts on the wiper blade 100, the lever assembly 2000 can transmit the pressing force, which is applied from the wiper arm, to the wiper rubber assembly 1000 at almost the same magnitude without decreasing towards the both ends of the wiper rubber assembly 1000.

In some embodiments, the fitting protrusions 2411, 2412 constituting the hinge-connection portion may be disposed in the arm portion 2210 of the second lever and the arm portion 2310 of the third lever and the fitting holes 2421, 2422 may be disposed in the arm receiving portion 2123 of the first lever and the arm receiving portion 2225 of the second lever. Further, wiper blades according to other embodiments may be configured to hold the wiper rubber assembly 1000 at four, eight or more pressure points by means of the above-described hinge-connection portion. For example, when the wiper rubber assembly 1000 is held at four pressure points, the lever assembly of the wiper blade 100 may comprise the first lever 2100 and a pair of the third levers 2300L, 2300R connected to the first lever by means of the above-described hinge-connection portion. Further, when the wiper rubber assembly 1000 is held at eight pressure points, the lever assembly of the wiper blade 100 may include an additional lever, which is shaped and configured similarly to the second lever 2200L, 2200R, between the first lever 2100 and the second lever 2200L, 2200R or between the second lever 2200L, 2200R and the third lever 2300L, 2300R.

The wiper blade 100 according to the embodiment that includes the above-described wiper rubber assembly 1000 and lever assembly 2000 is connected to at least three types of wiper arms via the connector assembly 3000. Said three types of wiper arms include different coupling units at respective distal ends. Herein, said three types of wiper arms are referred to as first to third wiper arms respectively, and the coupling units provided in their distal ends are referred to as first to third coupling units respectively. The connector assembly 3000 includes an adaptor, which contacts the first to third coupling units, and a slide cover, which is slidably coupled to said adaptor. The adaptor of the connector assembly 3000 and said first to third coupling units are connected through the fixation in front and rear directions FRD, the fixation in a vertical direction VD vertical to the front and rear directions FRD and the fixation in a horizontal direction HD orthogonal to the front and rear directions FRD and vertical to the vertical direction VD. The front and rear directions FRD are parallel to the longitudinal direction of the lever assembly 2000. The slide cover slides to the adaptor, accomplishing the fixation in the front and rear directions and the vertical direction between the adaptor and the first to third coupling units.

Figure 41:
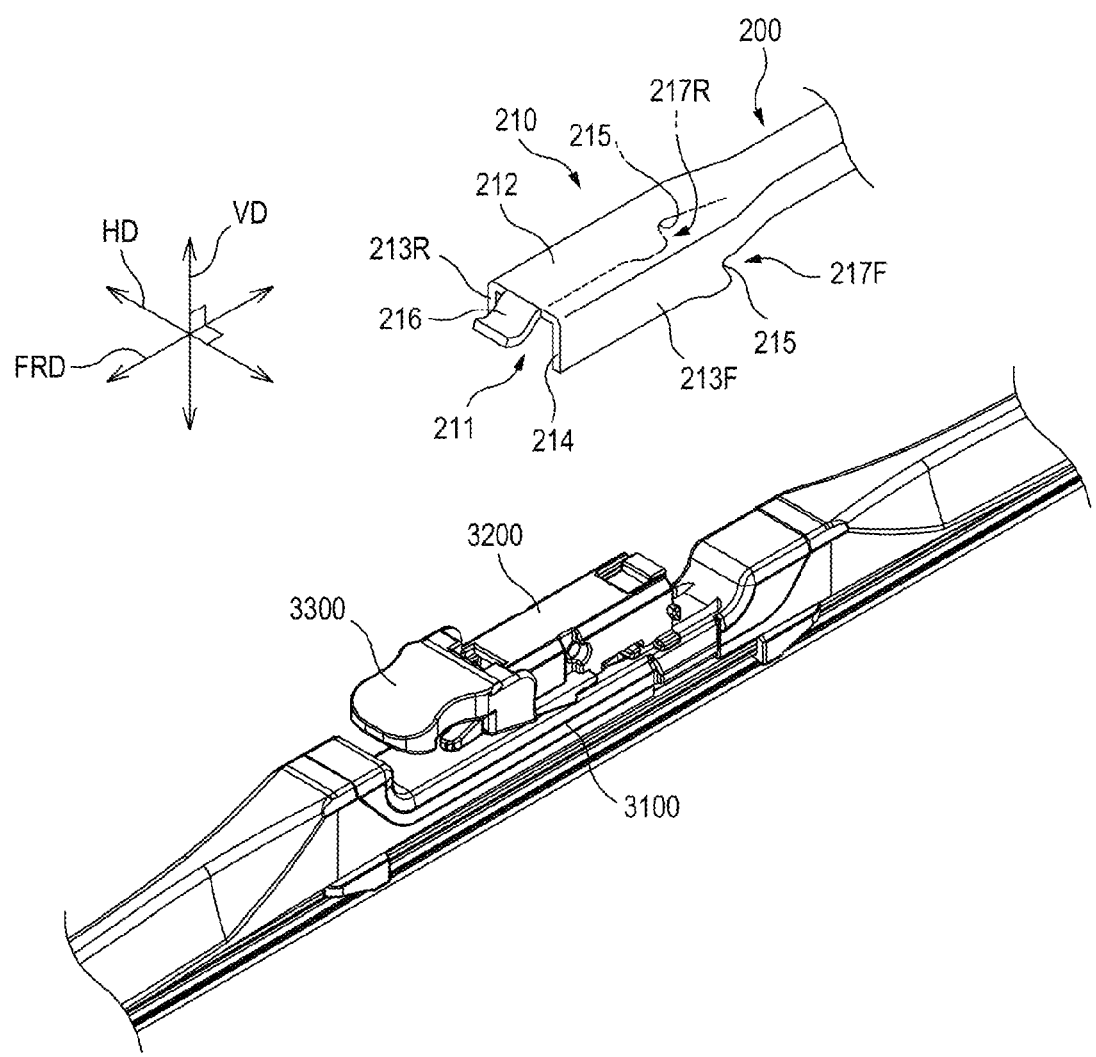
FIG. 41 is a perspective view showing the wiper blade according to an embodiment and a first wiper arm.

Referring to FIG. 41, the first wiper arm 200, to which the wiper blade 100 according to the embodiment is connected, includes the first coupling unit 210 at its distal end. The first coupling unit 210 includes a receiving portion 211 that receives a portion of the adaptor of the connector assembly 3000. The receiving portion 211 is defined by a top plate 212 and a pair of lateral plates 213F, 213R extending vertically from both lateral edges of the top plate 212. The first coupling unit 210 has a contact surface 214 and a support surface 215, which are used for the fixation in the front and rear directions FRD. The contact surface 214 and the support surface 215 are apart from each other in the front and rear directions FRD. The contact surface 214 of the first coupling unit 210 comprises a portion of a front end surface of the top plate 212 and front end surfaces of the lateral plates 213F, 213R. The support surface 215 of the first coupling unit 210 is formed at rear ends of the lateral plates 213F, 213R. The rear ends of the lateral plates 213F, 213R are formed with V-shaped notches 217F, 217R. The support surface 215 of the first coupling unit 210 comprises the surfaces of the V-shaped notches 217F, 217R. Further, the first coupling unit 210 includes a tongue 216 for the fixation in the vertical direction VD. The tongue 216 extends from the front end of the top plate 212 in an L shape. Inner surfaces of the lateral plates 213F, 213R participate in the fixation of the first coupling unit 210 in the horizontal direction HD. When the first coupling unit 210 and the connector assembly 3000 are connected together, the top plate 212 contacts or faces to the top surface of the adaptor at its under surface, while the lateral plates 213F, 213R contact or face to the lateral surfaces of the adaptor at their inner surfaces.

Figure 45:
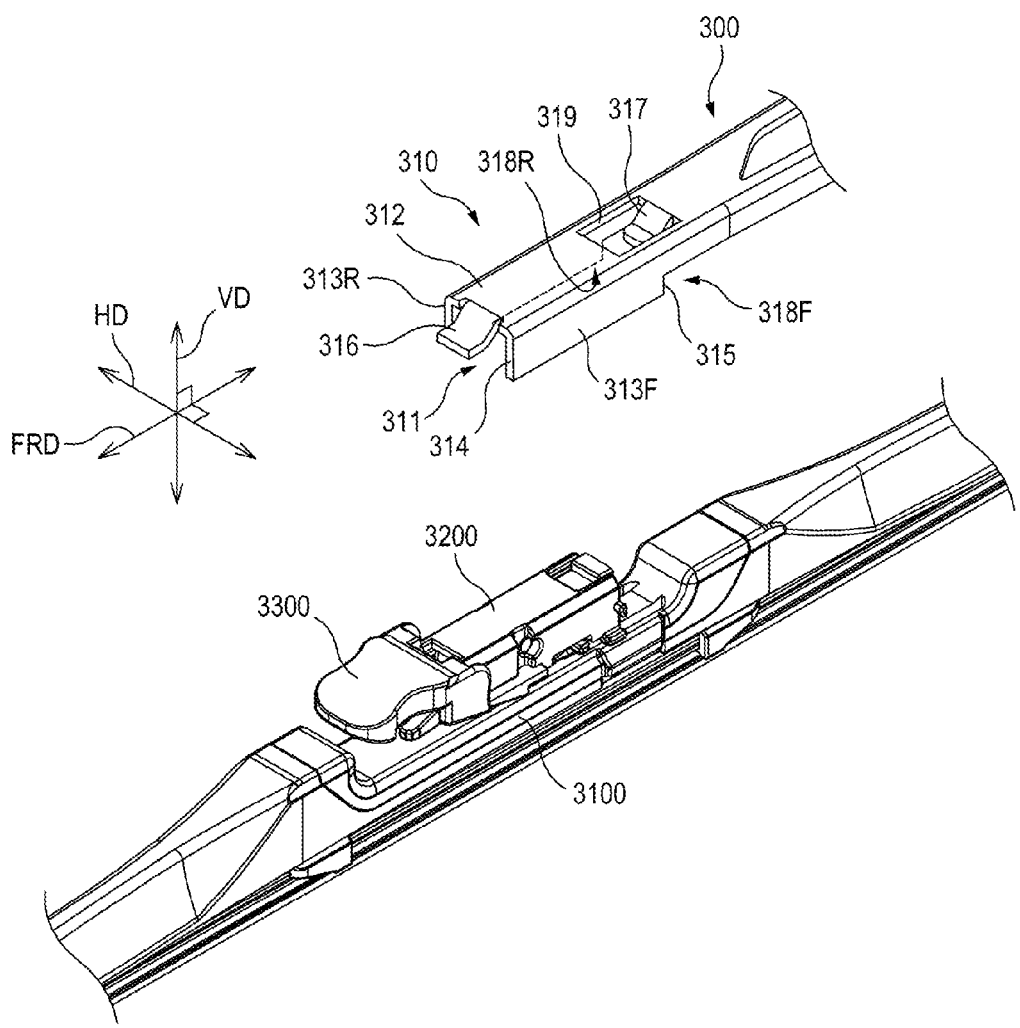
FIG. 45 is a perspective view showing the wiper blade according to an embodiment and a second wiper arm.

Referring to FIG. 45, the second wiper arm 300, to which the wiper blade 100 according to the embodiment is connected, includes the second coupling unit 310 at its distal end. The second coupling unit 310 includes a receiving portion 311 that receives a portion of the adaptor of the connector assembly 3000. The receiving portion 311 is defined by a top plate 312 and a pair of lateral plates 313F, 313R extending vertically from both lateral edges of the top plate 312. The second coupling unit 310 has a contact surface 314 and a support surface 315, which are for the fixation in the front and rear directions FRD. The contact surface 314 and the support surface 315 are apart from each other in the front and rear directions FRD. The contact surface 314 of the second coupling unit 310 comprises a portion of a front end surface of the top plate 312 and front end surfaces of the lateral plates 313F, 313R. The support surface 315 of the second coupling unit 310 is formed at rear ends of the lateral plates 313F, 313R. The rear ends of the lateral plates 313F, 313R are formed with L-shaped notches 318F, 318R. The support surface 315 of the second coupling unit 310 comprises the surfaces of the L-shaped notches 318F, 318R. Further, the second coupling unit 310 includes a first tongue 316 and a second tongue 317, which are used for the fixation in the vertical direction VD. The first tongue 316 extends from the front end of the top plate 312 in an L shape. The second tongue 317 is apart from the first tongue 316 in the front and rear directions FRD and extends in an L shape from a rear edge of an opening 319 formed in the top plate 312. Inner surfaces of the lateral plates 313F, 313R participate in the fixation of the second coupling unit 310 in the horizontal direction HD. When the second coupling unit 310 and the connector assembly 3000 are connected together, the top plate 312 contacts or faces to the top surface of the adaptor at its under surface, while the lateral plates 313F, 313R contact or face to the lateral surfaces of the adaptor at their inner surfaces.

Figure 49:
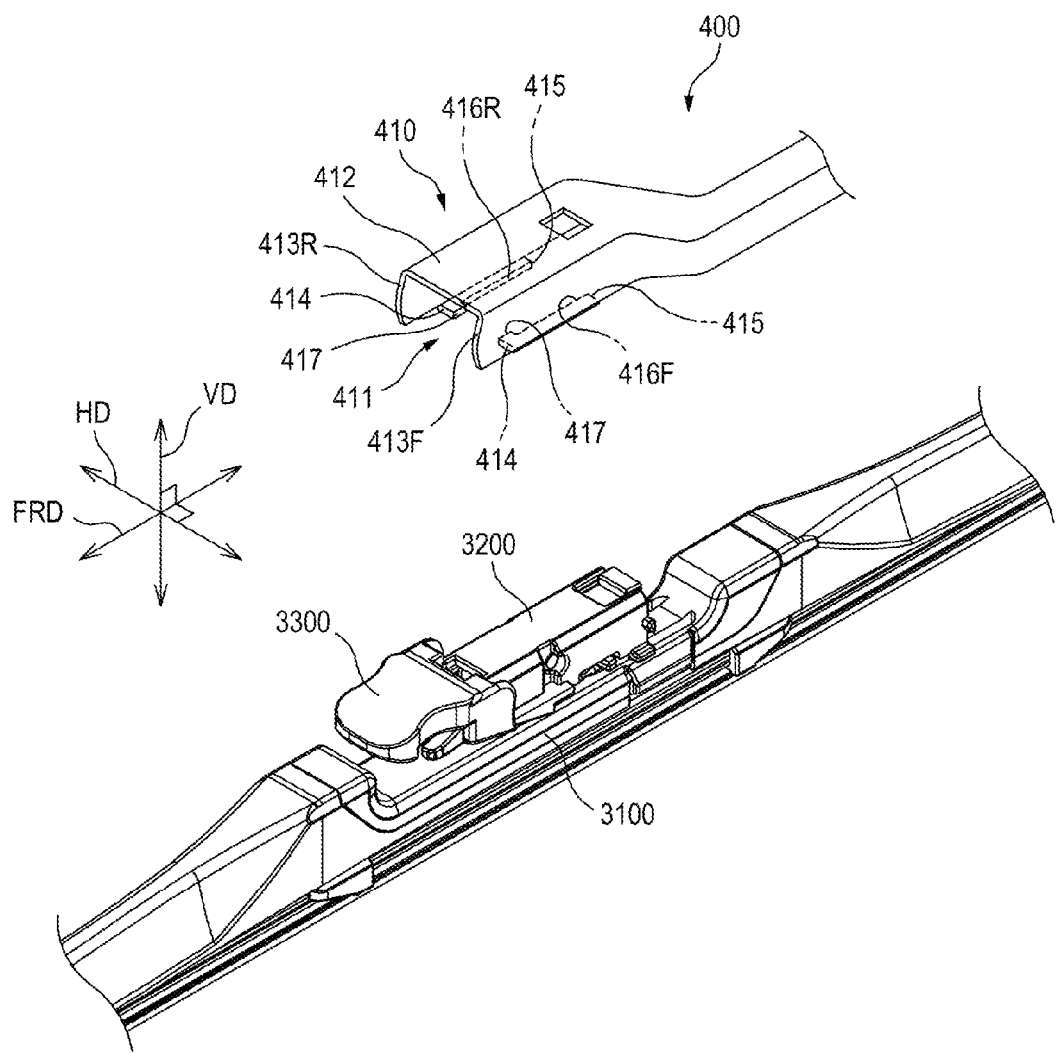
FIG. 49 is a perspective view showing the wiper blade according to an embodiment and a third wiper arm.

Referring to FIG. 49, the third wiper arm 400, to which the wiper blade 100 according to the embodiment is connected, includes the third coupling unit 410 at its distal end. The third coupling unit 410 includes a receiving portion 411 that receives a portion of the adaptor of the connector assembly 3000. The receiving portion 411 is defined by a top plate 412 and a pair of lateral plates 413F, 413R extending vertically from both lateral edges of the top plate 412. As the part for the fixation in the vertical direction VD, the third coupling unit 410 has a pair of tongues 416F, 416R, which protrude inwardly from bottom edges of the respective lateral plates 413F, 413R and extend longitudinally, and a pair of claws 417, which protrude inwardly from front ends of the respective tongues 416F, 416R towards the receiving portion 411. The contact surface 414 of the third coupling unit 410 for the fixation in the front and rear directions FRD comprises front end surfaces of the tongues 416F, 416R. The support surface 415, which is apart from the contact surface 414 for the fixation in the front and rear directions FRD, comprises rear end surfaces of the tongues 416F, 416R. Inner surfaces of the lateral plates 413F, 413R participate in the fixation of the third coupling unit 410 in the horizontal direction HD.

Descriptions are made as to the connector assembly 3000 and the parts constituting the connector assembly with reference to FIGS. 1 to 5 and 21 to 40.

The connector assembly 3000 is configured to connect the lever assembly 2000, which holds the wiper rubber assembly 1000, to the above-described first to third coupling units 210, 310, 410. In this embodiment, the connector assembly 3000 includes the following: a bracket 3100 detachably fixed to the connector seat 2500 provided in the first lever 2100; an adaptor 3200 rotatably mounted to a shaft part provided in the bracket 3100; and a slide cover 3300 slidably coupled to the adaptor 3200 in the longitudinal direction of the connector assembly 3000 or the lever assembly 2000.

The adaptor 3200 supports the first to third coupling units 210, 310, 410. The slide cover 3300 is slidable with respect to the adaptor 3200 in the longitudinal direction of the lever assembly 2000. Specifically, the slide cover 3300 slides with respect to the adaptor 3200 such that the slide cover 3300 moves to the adaptor 3200 in a first movement direction MD1 to fix the first to third coupling units 210, 310, 410 to the adaptor 3200 and the slide cover 3300 retracts from the adaptor 3200 in a second movement direction MD2 to release the fixation between the first to third coupling units 210, 310, 410 and the adaptor 3200. The first movement direction MD1 and the second movement direction MD2 are opposite to each other (i.e., forming 180° therebetween) and are parallel to the longitudinal direction of the lever assembly 2000.

The bracket 3100 serves as a base of the connector assembly 3000 and supports the adaptor 3200 and the slide cover 3300. The bracket 3100 is coupled to the connector seat 2500 of the first lever 2100 in such a manner that a longitudinal end of the bracket 3100 is inserted to the longitudinal end of the connector seat 2500, and then the bracket is rotated about its longitudinal end and thereafter a longitudinal opposite end of the bracket or a portion of the bracket adjacent to the longitudinal opposite end of the bracket snap-engages the longitudinal opposite end of the connector seat 2500 or a portion of the connector seat adjacent to the longitudinal opposite end of the connector seat.

The bracket 3100 includes a base plate 3110 that is seated on the seat surface 2510 of the connector seat 2500. The base plate 3110 has a flat portion 3111, which extends longitudinally, and a first inclined portion 3112 and a second inclined portion 3113, which are inclined at respective longitudinal outer ends of the flat portion 3111 with respect to the flat portion 3111. Further, the base plate 3110 has a first bent portion 3114, which extends from the longitudinal end of the flat portion 3111 in an L shape, and a second bent portion 3115, which extends in an L shape from the longitudinal opposite end of the flat portion 3111 located opposite the longitudinal end. Thus, when viewing the bracket 3100 from the front, the base plate 3110 has a shape of an elongated U. Since the flat portion 3111 is located lower than the first and second bent portions 3114, 3115, the adaptor 3200 and the slide cover 3300 can be located at a low height. The top surface of the first bent portion 3114 is higher than the top surface of the second bent portion 3115 relative to the flat portion 3111.

The bracket 3100 includes a contact surface 3121, 3122, 3123, which is formed complementarily to the seat surface 2510 of the connector seat 2500 and contacts the seat surface 2510. In this embodiment, said contact surface comprises a flat surface 3121, which forms the under surface of the flat portion 3111 of the base plate 3110, and inclined surfaces 3122, 3123, which forms the outer surfaces of the first and second inclined portions 3112, 3113. The flat surface 3121 of said contact surface directly contacts the flat surface 2511 of the seat surface 2510 of the connector seat 2500 and the inclined surfaces 3122, 3123 of said contact surface can contact the first and second inclined surfaces 2512, 2513 of the seat surface 2510 respectively. Further, the bracket 3100 includes a flange 3130, which is formed complementarily to the stepped surface 2520 of the connector seat and is formed along a periphery of the contact surface 3121, 3122, 3123. When the bracket 3100 is coupled to the connector seat 2500, the flange 3130 fits on the stepped surface 2520 or contacts a portion or the entirety of the stepped surface 2520. In this embodiment, the flange 3130 has the following: a lateral flange 3131 fitting on the lateral stepped surface 2521 of the stepped surface; a first top flange 3132 fitting on the first top stepped surface 2522 of the stepped surface; and a second top flange 3133 fitting on the second top stepped surface 2523 of the stepped surface. The lateral flange 3131 is formed along both lateral edges of the flat surface 3121 and both lateral edges of the inclined surfaces 3122, 3123 and protrudes to the extent of the protrusion height of the lateral stepped surface 2521. The first top flange 3132 is formed along the longitudinal outer end of the first bent portion 3114 and the second top flange 3133 is formed along the longitudinal outer end of the second bent portion 3115. The first and second top flanges 3132, 3133 protrude to the extent of the protruding distance of the first and second top stepped surfaces 2522, 2523.

The bracket 3100 is coupled to the connector seat 2500 of the lever assembly 2000 through insertion and then rotation. The bracket 3100 includes insertion protrusions 3141, which are inserted to the insertion slots 2531 of the connector seat 2500, and snap slots 3142 which the snap protrusions 2532 of the connector seat 2500 snap-engage. Further, the bracket 3100 includes positioning slots 3143 for positioning relative to the connector seat 2500.

The base plate 3110 has a first insertion portion 3144, which is inserted to the first recess 2514 of the connector seat, and a second insertion portion 3145, which is inserted to the second recess 2515 of the connector seat. The first insertion portion 3144 is formed in a shape of a pair of fins, which protrude from the first bent portion 3114 beyond the first inclined portion 3112. The insertion protrusions 3141 are formed at tip ends of the first insertion portion 3144 and have a semi-circular shape when viewing the bracket 3100 from the front. An insertion slot 3146, to which the insertion protrusion 2534 of the connector seat are inserted, is formed between said fins constituting the first insertion portion 3144. The second insertion portion 3145 is formed in a shape of a pair of fins, which protrude from the second bent portion 3115 beyond the second inclined portion 3113.

The snap slots 3142 are formed on the surface of the lateral flange 3131 below the flat surface 3121 of the contact surface of the base plate 3110. The length of each snap slot 3142 is longer than the distance between the snap protrusions 2532 located in a lateral edge of the connector seat 2500. Portions of the lateral flange 3131 below each snap slot 3142 (a portion of an edge of the lateral flange 3131 located opposite the snap slot 3142) protrude outwardly and thereby the flange 3130 includes a pair of ear portions 3134. The ear portions 3134 of the flange are formed in the position corresponding to the auxiliary stepped surfaces 2524 of the stepped surface 2520 of the connector seat. Accordingly, if the bracket 3100 is rotated to the connector seat 2500, the snap protrusions 2532 pass the ear portion 3134 and then snap-engage the snap slots 3142. The positioning slots 3143 are perforated in the flat portion 3111 of the base plate 3110. If the bracket 3100 is rotated to the connector seat 2500, the positioning ridges 2533 of the connector seat are inserted or fitted to the positioning slots 3143 of the bracket 3100.

Figure 26:
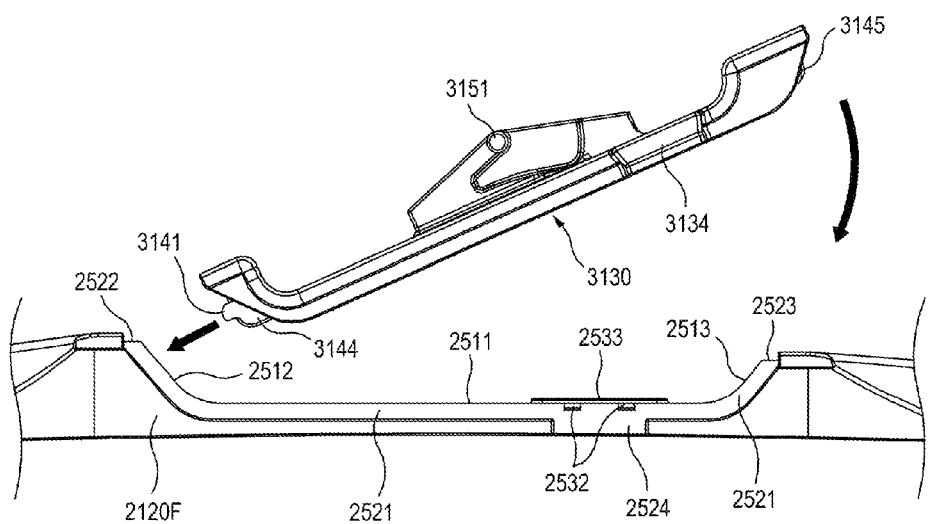
FIG. 26 shows an assembly example between a connector seat of the lever assembly and the bracket of the connector assembly.
Figure 27:
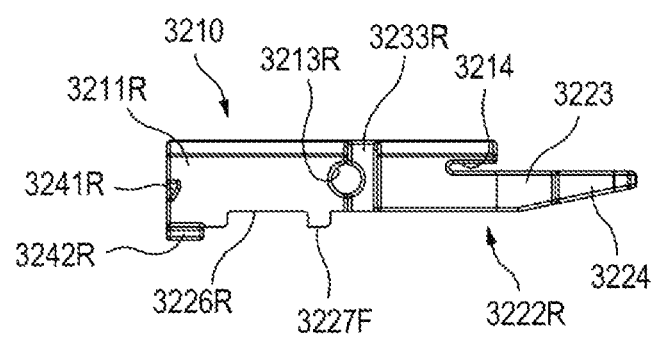
FIG. 27 is a rear view of an adaptor of the connector assembly shown in FIG. 21.

As shown in FIG. 26, when the bracket 3100 is coupled to the connector seat 2500, first, the one end of the bracket 3100, at which the insertion protrusions 3141 are located, is tilted lower than the opposite end of the bracket and then the insertion protrusions 3141 of the bracket are inserted to the insertion slots 2531 of the connector seat. When the first insertion portion 3144 located at the first bent portion 3114 contacts the wall surface of the first recess 2514 of the connector seat, the insertion is completed. If the insertion is completed, the insertion protrusions 3141 of the bracket are inserted in the insertion slots 2531 of the connector seat and the insertion protrusion 2534 of the connector seat is inserted to the insertion slot 3146 of the bracket. Thereafter, the bracket 3100 is rotated towards the connector seat 2500 about the insertion protrusions 3141. As the bracket 3100 is rotated, the snap protrusions 2532 snap-engage the snap slots 3142, the positioning ridges 2533 are inserted to the positioning slots 3143 and the second insertion portion 3145 is fitted to the second recess 2515. If the bracket 3100 is coupled to the connector seat 2500, the flange 3130 of the bracket 3100 fits on the stepped surface 2520 of the connector seat and the ear portions 3134 of the flange 3130 are positioned immediately above the auxiliary stepped surfaces 2524. The user can identify the coupling position of the bracket 3100 relative to the connector seat 2500 by matching the ear portion 3134 of the flange 3130 with the auxiliary stepped surface 2524 of the connector seat 2500. Further, if the bracket 3100 is coupled to the connector seat 2500, the ear portions 3134 protrude outwardly of the bracket 3100 above the auxiliary stepped surfaces 2524. Accordingly, when separating the bracket 3100 from the connector seat 2500, the ear portion 3134 can serve as a part that the user can push with his finger, or any tool can be inserted between the ear portion 3134 and the auxiliary stepped surface 2524. Further, in the connector seat 2500 and the connector assembly 3000, the distance between the longitudinal inner end of the first top stepped surface 2522 and the longitudinal inner end of the second top stepped surface 2523 is shorter than the distance between the tip end of the insertion protrusion 3141 and the longitudinal outer end of the second top flange 3133, which is located opposite the insertion protrusion 3141. Furthermore, the longitudinal inner end of the first top stepped surface 2522 of the stepped surface 2520 is higher than the longitudinal inner end of the second top stepped surface 2523 relative to the bottom edge of the first lever 2100. Thus, if the second insertion portion 3145 of the bracket 3100 is inserted to the second recess 2515 and the second top flange 3133 is brought into contact with the second top stepped surface 2523, then the bracket 3100 is not coupled to the connector seat 2500. Accordingly, the user or worker can readily identify the accurate coupling position of the bracket 3100 relative to the connector seat 2500.

The bracket 3100 includes a rotation shaft 3151 to which the adaptor 3200 is rotatably coupled. The rotation shaft 3151 is located at a top end of a support wall 3152, which extends vertically from the flat portion 3111 of the base plate, and extends in a width direction orthogonal to the longitudinal direction of the lever assembly 2000. Further, the rotation shaft 3151 protrudes outwardly of the support wall 3152. Both ends of the rotation shaft 3151 are chamfered along a circumferential direction of the rotation shaft. The rotation shaft 3151 serves as a rotation center of the adaptor 3200. The support wall 3152 has an approximately triangular shape when viewing the bracket 3100 from the front. Thus, a left portion and a right portion of the support wall 3152 are declined towards the flat portion 3111. A recess 3153F, 3153R is formed in either lateral surface of the support wall 3152. The recess 3153F, 3153R receives an engagement pin of the slide cover 3300, thus preventing the interference between said engagement pin and the support wall 3152.

The adaptor 3200 is rotatably mounted to the bracket 3100. The adaptor 3200 includes an insertion portion 3210 that is inserted to the receiving portion 211, 311, 411 of the first to third coupling units. The insertion portion 3210 includes a pair of lateral walls 3211F, 3211R and a top wall 3212 interconnecting the lateral walls 3211F, 3211R. The rotation shaft 3151 and a portion of the support wall 3152 of the bracket are inserted into between the lateral walls 3211F, 3211R.

Bearing holes 3213F, 3213R, to which the both ends of the rotation shaft 3151 of the bracket are fitted respectively, are perforated in the respective lateral walls 3211F, 3211R. Thus, the adaptor 3200 is rotatably joined to the bracket 3100 by the lateral walls 3211F, 3211R, to which the rotation shaft 3151 is coupled. Alternatively, the bearing hole 3213F, 3213R may be provided in the lateral wall at the depth at which the bearing hole does not perforates the lateral wall.

The adaptor 3200 is configured to allow the slide movement of the slide cover 3300 and to limit the slide movement of the slide cover 3300. In this embodiment, a portion of the slide cover 3300 is situated in the space defined by the lateral walls 3211F, 3211R and the top wall 3212 of the adaptor 3200 and the slide cover 3300 is slidable to and from the adaptor 3200 in the first movement direction MD1, which is parallel to the longitudinal direction of the lever assembly 2000 or the connector assembly 3000, and in the second movement direction MD2, which is opposite to the first movement direction MD1 by 180°.

To guide the slide movement of the slide cover 3300, the adaptor 3200 includes a pair of guide rails 3221F, 3221R. The guide rails 3221F, 3221R protrude on the respective inner surfaces of the lateral walls 3211F, 3211R and extend in the longitudinal direction of the adaptor 3200 (the longitudinal direction of the lever assembly 2000).

Figure 28:
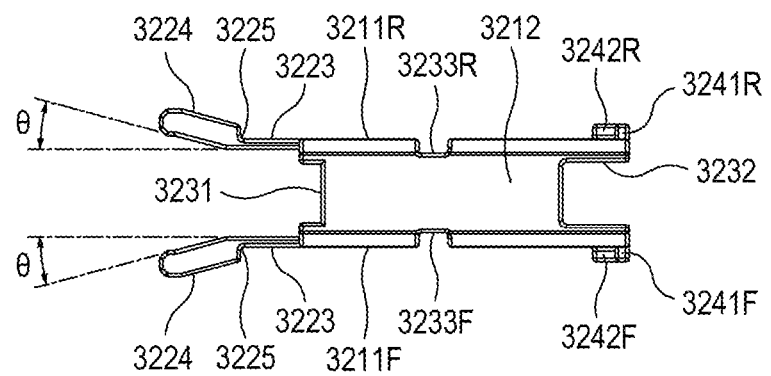
FIG. 28 is a top view of the adaptor of the connector assembly shown in FIG. 21.
Figure 29:
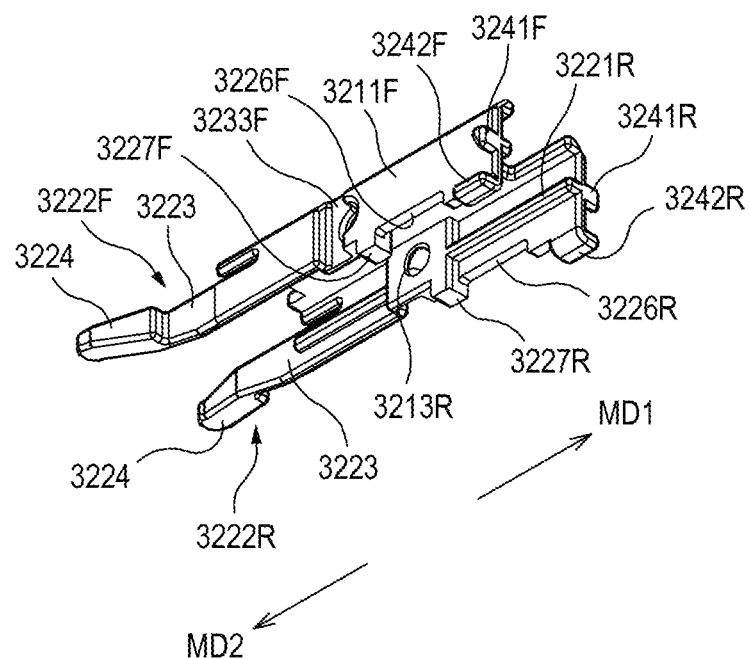
FIG. 29 is a lower perspective view of an adaptor of the connector assembly shown in FIG. 21.
Figure 30:
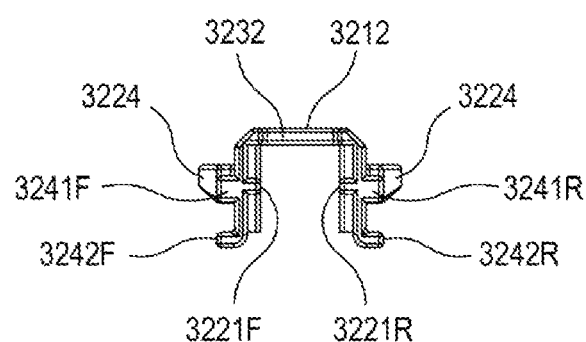
FIG. 30 is a right side view of the adaptor of the connector assembly shown in FIG. 21.
Figure 31:
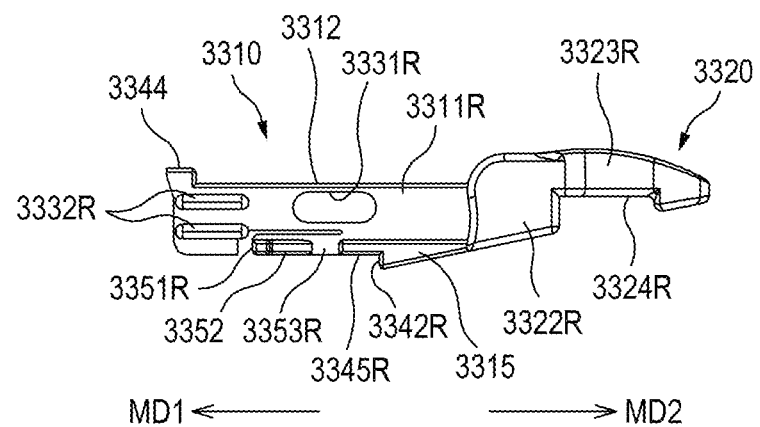
FIG. 31 is a rear view of a slide cover of the connector assembly shown in FIG. 21.
Figure 32:
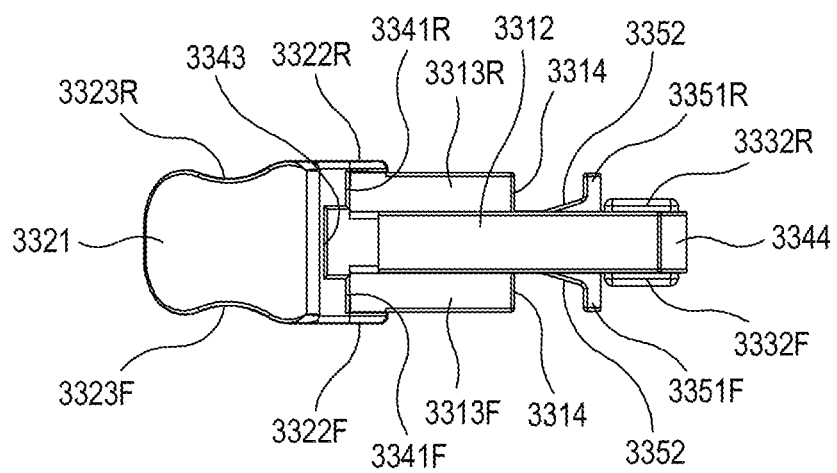
FIG. 32 is a top view of the slide cover of the connector assembly shown in FIG. 21.
Figure 33:
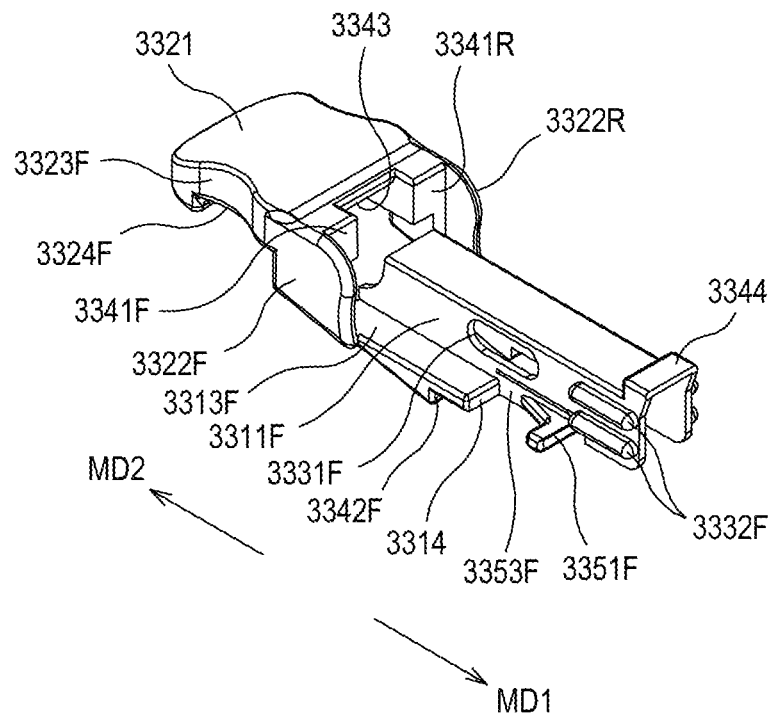
FIG. 33 is a perspective view of the slide cover of the connector assembly shown in FIG. 21.

To limit the slide movement of the slide cover 3300, the adaptor 3200 includes a pair of locking latches 3222F, 3222R, a pair of pin grooves 3226F, 3226R and a pair of stoppers 3227F, 3227R. The locking latches 3222F, 3222R extend in the second movement direction MD2 from the respective ends of the lateral walls 3211F, 3211R in the second movement direction MD2. Each locking latch 3222F, 3222R includes an elongated finger 3223, which extend from the lateral wall 3211F, 3211R in the second movement direction MD2, and a latch protrusion 3224 formed at a tip end of the finger 3223. The finger 3223 has the shape of an elongated bar which extends from one end of the lateral wall 3211F, 3211R in the second movement direction MD2. Thus, the finger 3223 can curve laterally inwardly of the adaptor 3200. To assist elastic curvature of the finger 3223, a portion of the lateral wall 3211F, 3211R adjacent to the top edge of the lateral wall is cut out, forming a slot 3214. If the slide cover 3300 is moved to the adaptor 3200 in the first movement direction MD1 and fixes the first to third coupling units 210, 310, 410 to the adaptor 3200, the locking latches 3222F, 3222R engage latch grooves of the slide cover 3300 at the latch protrusion 3224, thus locking the slide cover 3300 to the adaptor 3200. As shown in FIG. 28, when viewing the adaptor 3200 from the top, the latch protrusion 3224 is inclined laterally outwardly of the adaptor 3200 at an angle θ relative to the finger 3223. Further, the latch protrusion 3224 includes a concave curved surface 3225 at an end in the first movement direction MD1. The curved surface 3225 of the latch protrusion 3224 contacts an end of said latch groove in the first movement direction MD1. A pin groove 3226F, 3226R is formed at a bottom edge of each lateral wall 3211F, 3211R. The engagement pin of the slide cover 3300 is positioned in the pin groove 3226F, 3226R. The stopper 3227F, 3227R is formed at an end of the pin groove 3226F, 3226R in the second movement direction MD2. A surface of a connecting lug of the slide cover 3300 in the first movement direction MD1 contacts the stopper 3227F, 3227R, limiting the movement of the slide cover 3300 in the first movement direction MD1.

The adaptor 3200 includes a positioning part, which facilitates positioning of the adaptor relative to the first to third coupling units 210, 310, 410. The adaptor 3200 includes, at the insertion portion 3210, a front recess 3231, a rear recess 3232 and a pair of passage grooves 3233F, 3233R. The front recess 3231 is inwardly concavely formed at the end of the top wall 3212 in the second movement direction MD2. When connecting the adaptor 3200 of the connector assembly 3000 to the first coupling unit 210 or the second coupling unit 310, the tongue 216 of the first coupling unit 210 or the first tongue 316 of the second coupling unit 310 is received in the front recess 3231. The rear recess 3232 is inwardly concavely formed at the end of the top wall 3212 in the first movement direction MD1 (the end located opposite said the end in the second movement direction MD2). When connecting the adaptor 3200 of the connector assembly 3000 to the second coupling unit 310, the second tongue 317 of the second coupling unit 310 is situated in the rear recess 3232. Further, when the slide cover 3300 is joined to the adaptor 3200, a second hood of the slide cover 3300 is situated in the rear recess 3232. The passage grooves 3233F, 3233R vertically extend from the top edges of the lateral walls 3211F, 3211R to the bottom edges of the lateral walls in the respective outer surfaces of the lateral walls 3211F, 3211R. The passage groove 3233F, 3233R overlaps with the bearing hole 3213F, 3213R and the bearing hole 3213F, 3213R is located in part in the passage groove 3233F, 3233R.

For the fixation of the first to third coupling units 210, 310, 410 in the front and rear directions FRD, the adaptor 3200 includes a supporting portion supporting the support surfaces 215, 315, 415 of the first to third coupling units 210, 310, 410. The adaptor 3200 includes a pair of first support protrusions 3241F, 3241R, which contact the support surfaces 215, 315 of the first and second coupling units 210, 310 in the first movement direction MD1 and support the same. The first support protrusion 3241F, 3241R protrudes laterally outwardly from the end of the insertion portion 3210 in the first movement direction MD1 (i.e., the rear end of each lateral wall 3211F, 3211R). When viewing the adaptor 3200 from the front, the first support protrusions 3241F, 3241R have a triangular shape. The first support protrusions 3241F, 3241R are fitted to the V-shaped notches 217F, 217R of the first coupling unit 210 or the L-shaped notches 318F, 318R of the second coupling unit 310 and support the same in the second movement direction MD2. Since the first support protrusions 3241F, 3241R are located at the rear ends of the lateral walls 3211F, 3211R, the first coupling unit 210 or the second coupling unit 310 is not separated rearward from the lateral walls 3211F, 3211R of the adaptor 3200. The adaptor 3200 includes a pair of second support protrusions 3242F, 3242R, which contact the support surface 415 of the third coupling unit 410 in the first movement direction MD1 and support the same. The second support protrusions 3242F, 3242R are located at the end of the insertion portion 3210 in the first movement direction MD1 (i.e., the respective rear ends of the lateral walls 3211F, 3211R) and protrude laterally outwardly at the respective bottom edges of the lateral walls 3211F, 3211R. When the third coupling unit 410 and the connector assembly 3000 are connected, the support surface 415, which is located in the rear end surface of the tongue 416F, 416R of the third coupling unit, contacts the second support protrusion 3242F, 3242R and the second support protrusions 3242F, 3242R support the support surface 415 of the third coupling unit in the second movement direction MD2.

The slide cover 3300 is joined to the adaptor 3200 so as to be slidable in the first movement direction MD1 and the second movement direction MD2. In this embodiment, a portion of the slide cover 3300 is situated between the support wall 3152 of the bracket 3100 and the adaptor 3200. The slide cover 3300 is slidable in the first movement direction MD1 and the second movement direction MD2 while being retained by the rotation shaft 3151 and the adaptor 3200. The slide cover 3300 is slid to the adaptor 3200 in the first movement direction MD1, thus fixing the first to third coupling units 210, 310, 410 to the adaptor 3200. If the slide cover 3300 is slid in the second movement direction MD2, the first to third coupling units 210, 310, 410 and the adaptor 3200 can be separated from each other.

The slide cover 3300 includes a slider 3310 that is slidably fitted to the adaptor 3200. The slider 3310 has a pair of lateral walls 3311F, 3311R and a top wall 3312 extending between top edges of the lateral walls 3311F, 3311R. Further, the slide cover 3300 includes a handle 3320 extending from the slider 3310 in the second movement direction MD2. The handle 3320 has a plate-shaped handle body 3321 and the handle body 3321 is integrated with the slider 3310 via a pair of connecting legs 3322F, 3322R. The handle body 3321 has a concave curved surface portion 3323F, 3323R, which the user can hold, at either side thereof. The curved surface portions 3323F, 3323R are inwardly concave when viewing the slide cover 3300 from the top. The handle body 3321 has a pair of latch grooves 3324F, 3324R at its respective sides and the latch grooves 3324F, 3324R are located in the respective curved surface portions 3323F, 3323R. The latch groove 3324F, 3324R is upwardly concavely formed at a bottom edge of the handle body 3321. The latch protrusions 3324 of the locking latches 3222F, 3222R of the adaptor 3200 engage the latch grooves 3324F, 3324R.

Figure 34:
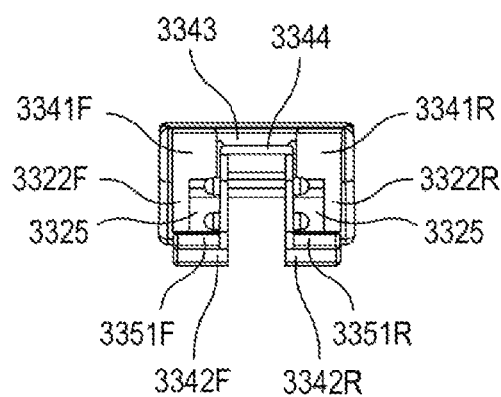
FIG. 34 is a right side view of the slide cover of the connector assembly shown in FIG. 21.
Figure 35:
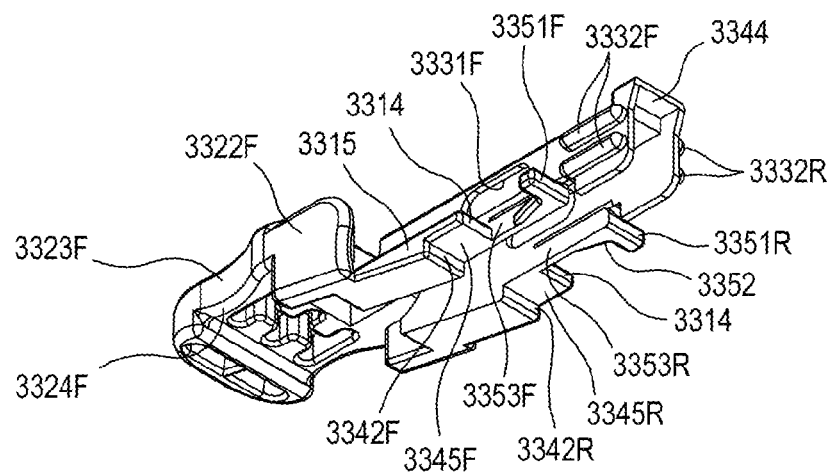
FIG. 35 is a lower perspective view of the slide cover of the connector assembly shown in FIG. 21.

The slider 3310 has a pair of connecting lugs 3313F, 3313R, which extend beyond the ends of the lateral walls 3311F, 3311R in the second movement direction MD2, at the bottom edges of the lateral walls 3311F, 3311R. The connecting legs 3322F, 3322R interconnect the sides of the handle body 3321 and the sides of the connecting lugs 3313F, 3313R. The top surface of the handle body 3321 is located higher than the top wall 3312 of the slider 3310. The connecting legs 3322F, 3322R are spaced apart from the lateral walls 3311F, 3311R of the slider by the connecting lugs 3313F, 3313R. Thus, as shown in FIG. 34, an insertion space 3325 is defined between the connecting leg 3322F, 3322R and the lateral wall 3311F, 3311R. The locking latch 3222F, 3222R of the adaptor 3200 is inserted towards the handle 3320 through the insertion space 3325. The front bottom portion of the connecting lug 3313F, 3313R protrudes downwardly, forming a wedge-shaped protrusion 3315. An end surface 3314 of the connecting lug 3313F, 3313R in the first movement direction MD1 contacts a surface of the stopper 3227F, 3227R of the adaptor 3200 in the second movement direction MD2.

To guide the slide movement of the slide cover 3300, the slide cover 3300 includes: a pair of slide slots 3331F, 3331R formed in the middle of the respective lateral walls 3311F, 3311R of the slider; and a pair of slide rails 3332F, 3332R at the end of each lateral wall 3311F, 3311R in the first movement direction MD1. The slide slot 3331F, 3331R is perforated in the lateral wall 3311F, 3311R and extends linearly. The both ends of the rotation shaft 3151 of the bracket are fitted to the slide slots 3331F, 3331R respectively. Thus, the slider 3310 is located inside the insertion portion 3210 of the adaptor with the rotation shaft 3151 fitted to the slide slots 3331F, 3331R. The slide rails 3332F protrude on the outer surface of the lateral wall 3311F and extend in the first and second movement directions MD1, MD2. The slide rails 3232R protrude on the outer surface of the lateral wall 3311R and extend in the first and second movement directions MD1, MD2. The guide rail 3221F of the adaptor is fitted to the slide rails 3232F and the guide rail 3221R of the adaptor is fitted to the slide rails 3232R. Thus, the slide cover 3300 is slidable along the adaptor 3200 in the longitudinal direction of the adaptor 3200 (in the first movement direction MD1 and the second movement direction MD2) in the state where the rotation shaft 3151 of the bracket is fitted to the slide slots 3331F, 3331R and the guide rails 3221F, 3221R of the adaptor are fitted to the slide rails 3332F, 3332R.

For the fixation of the first to third coupling units 210, 310, 410 in the front and rear directions FRD, the slide cover 3300 includes a push portion, which contacts the contact surfaces of the first to third coupling units and pushes or presses the first to third coupling units towards the adaptor 3200 in the first movement direction MD1. The slide cover 3300 includes: a first push surface 3341F, 3341R, which contacts the contact surface 214 of the first coupling unit 210 or the contact surface 314 of the second coupling unit 310 and pushes the first coupling unit or the second coupling unit towards the adaptor 3200 in the first movement direction MD1; and a second push surface 3342F, 3342R, which contacts the contact surface 414 of the third coupling unit 410 and pushes the third coupling unit 410 towards the adaptor 3200 in the first movement direction MD1. The first push surface 3341F, 3341R is formed in the end surface of the handle body 3321 in the first movement direction MD1. If the slide cover 3300 is moved towards the adaptor 3200 in the first movement direction MD1, the first push surface 3341F, 3341R contacts the contact surface 214 of the first coupling unit 210 or the contact surface 314 of the second coupling unit 310 and then pushes or presses the first coupling unit 210 or the second coupling unit 310 towards the adaptor 3200 (towards the first support protrusions 3241F, 3241R). The second push surfaces 3342F, 3342R is formed in the end surface of the wedge-shaped protrusion 3315 of the connecting lugs 3313F, 3313R in the first movement direction MD1. If the slide cover 3300 is moved towards the adaptor 3200 in the first movement direction MD1, the second push surface 3342F, 3342R contacts the contact surface 414, which is located in the front end of the tongues 416F, 416R of the third coupling unit 410 and then pushes the third coupling unit 410 towards the second support protrusions 3242F, 3242R.

For the fixation of the first and second coupling units 210, 310 in the vertical direction VD, the slide cover 3300 includes a hood covering the tongue 216 of the first coupling unit or the first and second tongues 316, 317 of the second coupling unit. The slide cover 3300 includes: a first hood 3343 covering the tongue 216 of the first coupling unit 210 or the first tongue 316 of the second coupling unit 310; and a second hood 3344 being apart from the first hood 3343 in the first movement direction MD1 and covering the second tongue 317 of the second coupling unit 310. The first hood 3343 is formed between the end surface of the handle body 3321 in the first movement direction MD1 and the under surface of the handle body 3321. The first hood 3343 has an L shape when viewing the slide cover 3300 from the front. The second hood 3344 protrudes upwardly from the end of the top wall 3312 of the slider in the first movement direction MD1. The second hood 3344 has an L shape when viewing the slide cover 3300 from the front. When the adaptor 3200 of the connector assembly 3000 is connected to the first coupling unit 210, the first hood 3343 covers the tongue 216 of the first coupling unit 210 along with the movement of the slide cover 3300 in the first movement direction MD1. When the connector assembly 3000 is connected to the second coupling unit 310, the first hood 3343 and the second hood 3344 cover the first and second tongues 316, 317 of the second coupling unit 310 respectively along with the movement of the slide cover 3300 in the first movement direction MD1. When the slide cover 3300 is moved in the first movement direction MD1 and fixes the first and second coupling units 210, 310 to the adaptor 3200, the hoods and the tongues may be positioned with slight gap therebetween or may contact each other.

For the fixation of the third coupling unit 410 in the vertical direction VD, the slide cover 3300 includes a latch surface 3345F, 3345R, which covers a portion of a top surface of the tongue 416F, 416R of the third coupling unit. The latch surface 3345F, 3345R adjoins the second push surface 3342F, 3342R. In this embodiment, the latch surface 3345F, 3345R comprises the under surface of the connecting lug 3313F, 3313R, which is located between the surface of the wedge-shaped protrusion 3315 of the connecting lug 3313F, 3313R in the first movement direction MD1 (the second push surface 3342F, 3342R) and the end surface 3314 of the connecting lug 3313F, 3313R. Thus, when viewing the slide cover 3300 from the front, the second push surface 3342F, 3342R and the latch surface 3345F, 3345R forms an L shape, i.e., a right angle. If the slide cover 3300 is moved in the first movement direction MD1 to fix the third coupling unit 410 to the adaptor 3200, the latch surface 3345F, 3345R covers a portion of the top surface of the tongue 416F, 416R, which is located at the rear of the contact surface 414 of the tongue 416F, 416R of the third coupling unit. Accordingly, the top surface of the tongue 416F, 416R of the third coupling unit can contact the latch surface 3345F, 3345R, thus achieving the fixation in the vertical direction VD.

When the slide cover 3300 is moved in the second movement direction MD2, a portion of the slide cover 3300 engages a portion of the adaptor 3200 and thus the slide movement of the slide cover is stopped in the second movement direction MD2. The slide cover 3300 includes a pair of engagement pins 3351F, 3351R which are received in the pin grooves 3226F, 3226R of the adaptor 3200. The engagement pins 3351F, 3351R are provided such that they are placed in the pin grooves 3226F, 3226R when the slide cover 3300 is fitted to the adaptor 3200. The engagement pins 3351F, 3351R are movable laterally inwardly of and laterally outwardly of the slider 3310. The bottom edge portion of the lateral wall 3311F, 3311R of the slider is cut out parallel to the bottom edge, forming an elastic arm 3353F, 3353R. Thus, the elastic arm 3353F, 3353R is capable of curving laterally inwardly of and laterally outwardly of the lateral wall 3311F, 3311R. The engagement pin 3351F, 3351R is provided at a tip end of the elastic arm 3353F, 3353R and protrudes laterally outwardly of the lateral wall 3311F, 3311R. Since the elastic arm 3353F, 3353R is capable of curving laterally inwardly of and laterally outwardly of the lateral wall 3311F, 3311R, the engagement pin 3351F, 3351R can be moved inwardly of the lateral wall 3311F, 3311R and can revert to its original position due to the restoring force of the elastic arm 3353F, 3353R. The engagement pin 3351F, 3351R includes a slope 3352 at its surface facing in the second movement direction MD2. The engagement pin 3351F, 3351R contacts the end of the pin groove 3226F, 3226R in the second movement direction MD2 at the slope 3352. Thus, as the slide cover 3300 is moved from the adaptor 3200 in the second movement direction MD2, the end of the pin groove 3226F, 3226R in the second movement direction MD2 contacts the slope 3352 and thereby the elastic arm 3353F, 3353R curves inwardly of the lateral wall 3311F, 3311R, thus moving the engagement pin 3351F, 3351R inwardly of the lateral wall 3311F, 3311R. As the slide cover 3300 is moved to the adaptor 3200 in the first movement direction MD1, the engagement pin 3351F, 3351R, which has been moved inwardly of the lateral wall 3311F, 3311R, protrudes laterally outwardly of the lateral wall 3311F, 3311R due to the restoring force of the elastic arm 3353F, 3353R and is then located above the top surface of the tongue 416F, 416R of the third coupling unit.

Figure 36:
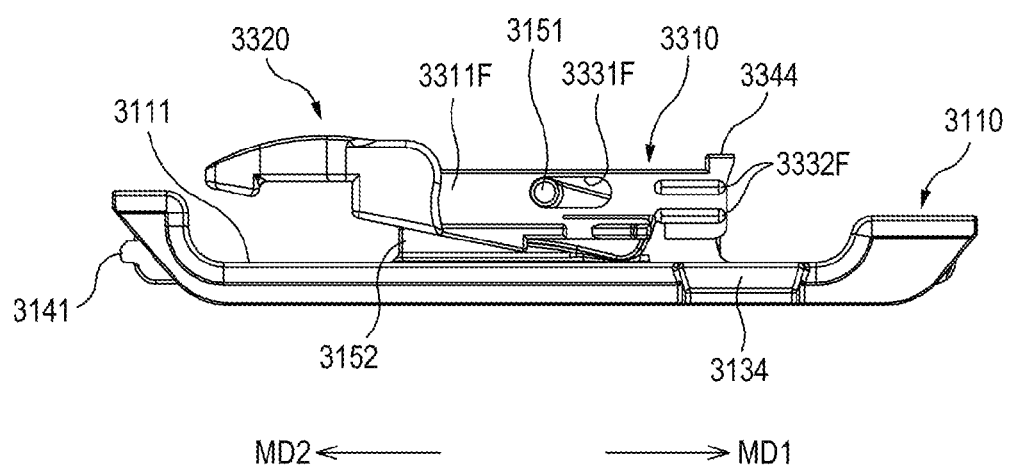
FIG. 36 is a front view showing the bracket and the slide cover mounted to the bracket.
Figure 37:
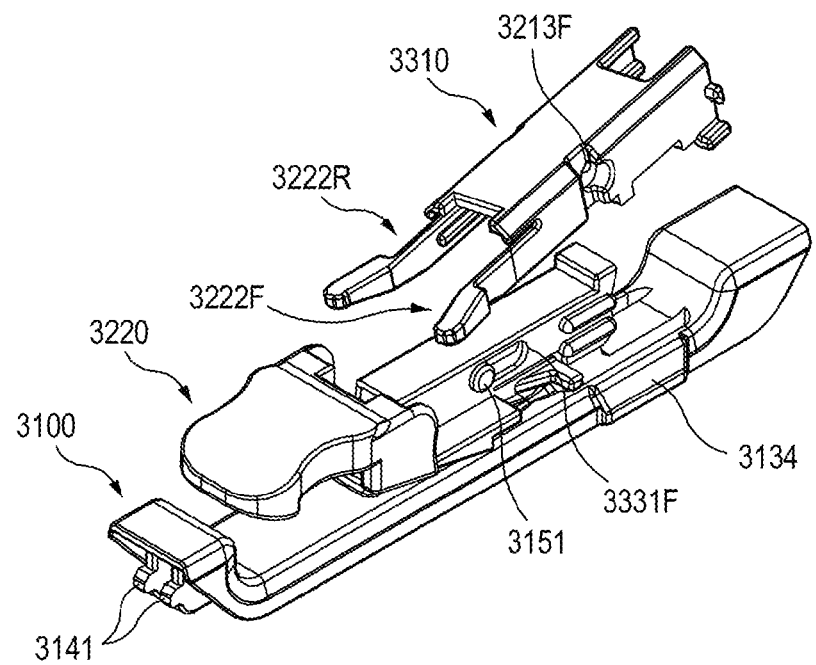
FIG. 37 shows an example wherein the adaptor is being assembled to the slide cover and the bracket.
Figure 38:
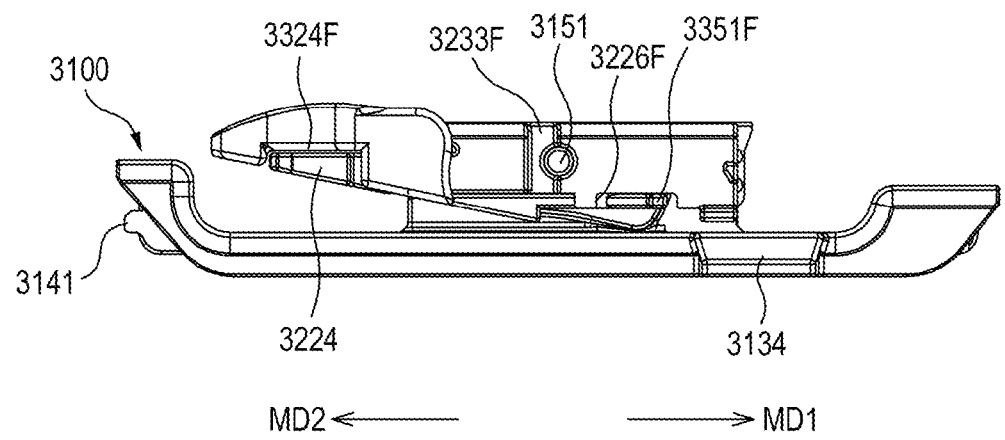
FIG. 38 is a front view of an assembled connector assembly, showing that the slide cover is maintained to the adaptor in a fixation position.
Figure 39:
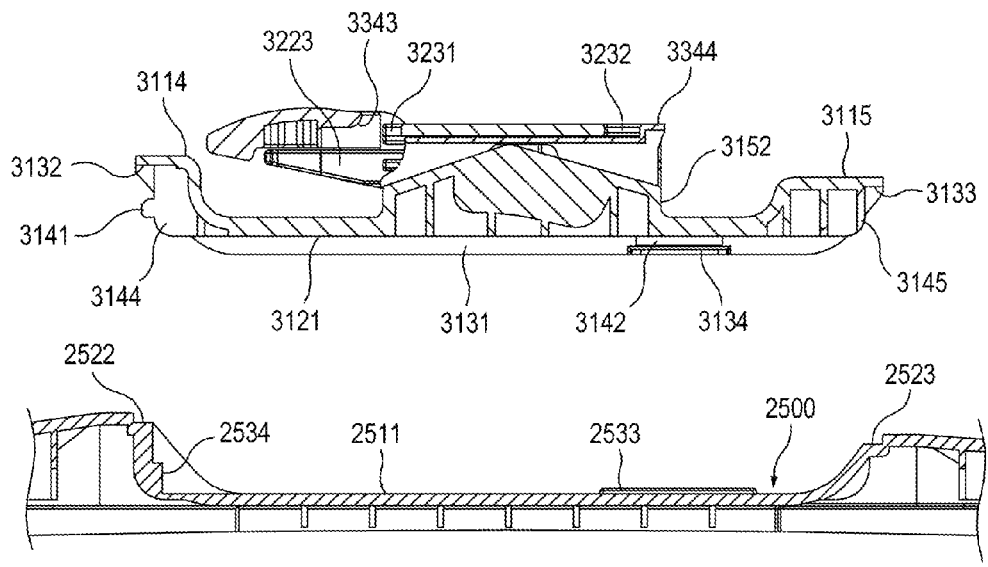
FIG. 39 shows a longitudinal cross section of the assembled connector assembly and a fragmental longitudinal cross section of the first lever.
Figure 40:
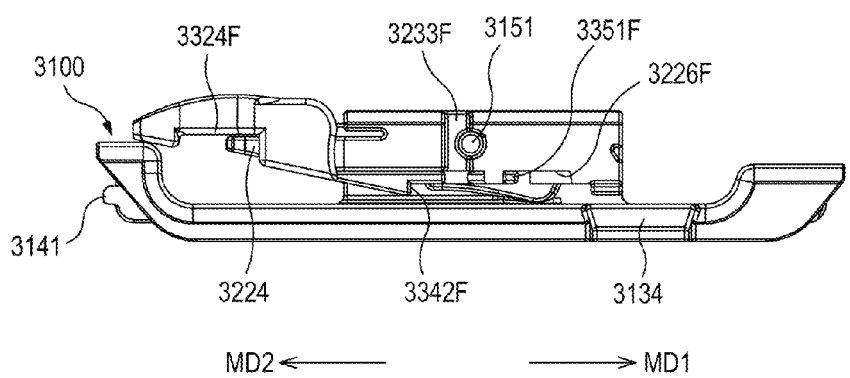
FIG. 40 is a front view of the assembled connector assembly, showing that the slide cover is maintained to the adaptor in a release position.

The slide cover 3300 is joined to the bracket 3100 by placing the lateral walls 3311F, 3311R of the slider 3310 on the rotation shaft 3151 of the bracket 3100 and then pressing the slider 3310 toward the bracket 3100. As shown in FIG. 36, when the slide cover 3300 is mounted to the bracket 3100, the rotation shaft 3151 of the bracket is located in the slide slots 3331F, 3331R of the slide cover. The slide cover 3300 is movable relative to the bracket 3100 in the first movement direction MD1 and in the second movement direction MD2 within the range limited by the length of the slide slot 3331F, 3331R. The adaptor 3200 is coupled to the rotation shaft 3151 of the bracket in such a way that the adaptor is placed on the slide cover 3300. As shown in FIG. 37, the locking latches 3222F, 3222R of the adaptor 3200 are inserted into the insertion space 3325 of the slide cover 3300 and, at the same time, the adaptor 3200 is pushed towards the slide cover 3300. If the both ends of the rotation shaft 3151 of the bracket, which protrude laterally outwardly of the slide slots 3331F, 3331R of the slide cover 3300, are fitted to the bearing holes 3213F, 3213R of the adaptor, then the adaptor 3200 is mounted to the bracket 3100, as shown in FIG. 38. Referring to FIGS. 38 and 39, the slide cover 3300 is maintained to the adaptor 3200 in a fixation position. Said fixation position is the position where the slide cover 3300 is moved to the adaptor 3200 in the first movement direction MD1 and thus fixes the first to third coupling units 210, 310, 410 to the adaptor 3200. In said fixation position, the latch protrusions 3224 of the locking latches 3222F, 3222R are fitted to the latch grooves 3344F, 3344R of the slide cover and the engagement pins 3351F, 3351R are located adjacent to the ends of the pin grooves 3226F, 3226R of the adaptor in the first movement direction MD1. In said fixation position, the curved surface 3225 of the latch protrusion 3224 is in contact with the end of the latch groove 3344F, 3344R in the first movement direction MD1. Thus, although the latch protrusions 3224 are not fully fitted to the latch grooves 3344F, 3344R, the slide cover 3300 can be locked to the adaptor 3200. Further, in said fixation position, when viewing the connector assembly 3000 from the top, the latch protrusions 3224 protrude laterally outwardly from the curved surface portions 3323F, 3323R, which are formed in the handle 3320 of the slide cover 3300. Thus, if the user pushes the latch protrusions 3224 inwardly and curves the locking latches 3222F, 3222R inwardly, then the slide cover 3300 is movable from the adaptor 3200 in the second movement direction MD2. Referring to FIG. 40, the slide cover 3300 is moved from the adaptor 3200 and is maintained to the adaptor 3200 in a release position. Said release position is the position where the slide cover 3300 is maximumly moved from the adaptor 3200 in the second movement direction MD2. In said release position, the engagement pins 3351F, 3351R are in contact with the ends of the pin grooves 3226F, 3226R in the second movement direction MD2 and the tip ends of the engagement pins 3351F, 3351R hardly protrude outwardly of the lateral walls 3211F, 3211R of the adaptor 3200. Therefore, the movement of the slide cover 3300 is limited in the second movement direction MD2. Further, when viewing the connector assembly 3000 from the front, the second push surface 3342F, 3342R is located in the second movement direction MD2 away from the edge of the passage groove 3233F, 3233R in the second movement direction MD2.

Figure 42:
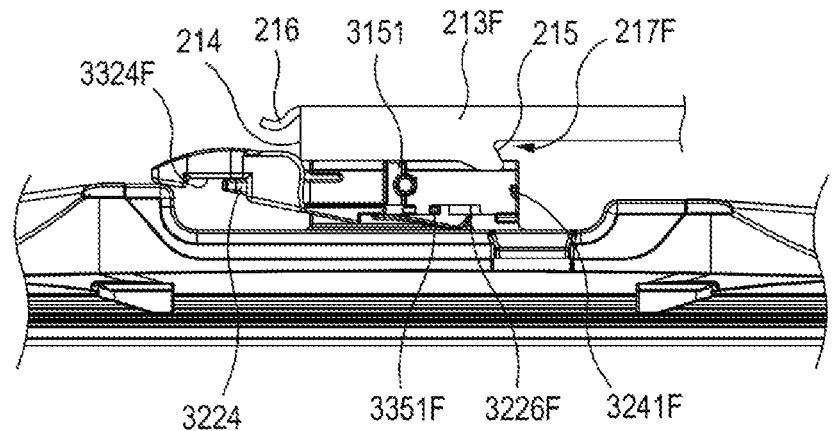
FIGS. 42 to 44 show a connection example between the wiper blade according to an embodiment and the first wiper arm.
Figure 43:
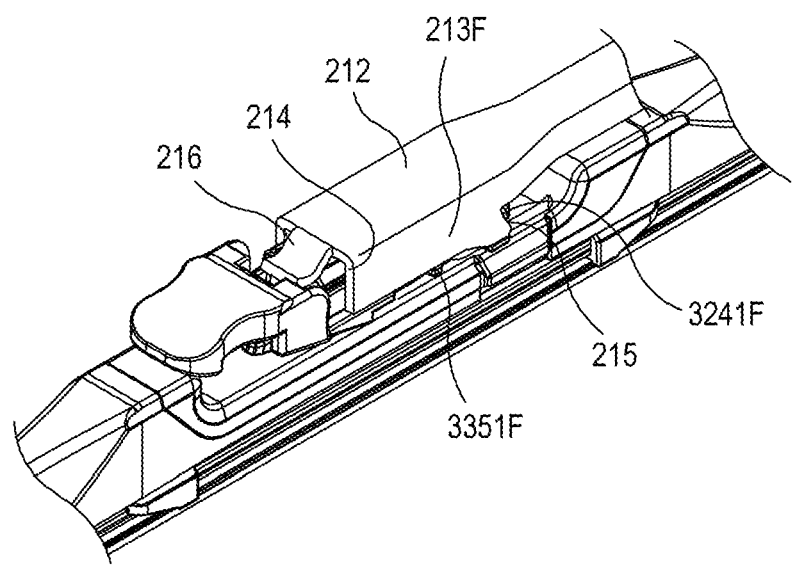
Figure 44:
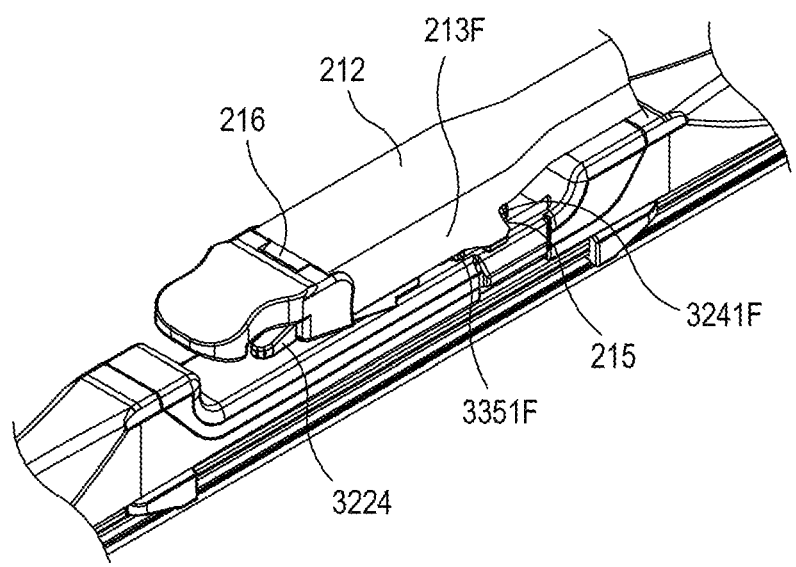

FIGS. 42 to 44 show a connection example between the wiper blade 100 according to an embodiment and the first wiper arm 200.

As shown in FIG. 42, the slide cover 3300 is moved from the adaptor 3200 in the second movement direction MD2 and is maintained in said release position. The latch protrusions 3224 are removed from the latch grooves 3344F, 3344R by pressing the latch protrusions 3224 inwardly. Then, the slide cover 3300, which is maintained in said fixation position, is movable in the second movement direction MD2. The insertion portion 3210 of the adaptor 3200 is inserted to the receiving portion 211 of the first coupling unit 210 in the state where the slide cover 3300 is maintained in said release position. At this time, the first support protrusions 3241F, 3241R can be positioned with a slight gap between the first support protrusions and the support surface 215 of the first coupling unit 210 in the first movement direction MD1 or can contact the support surface 215. As shown in FIG. 43, if the insertion portion 3210 is fully inserted, the top wall 3212 of the insertion portion 3210 contact the under surface of the top plate 212 of the first coupling unit 210 and the lateral walls 3211F, 3211R of the insertion portion 3210 contact the inner surfaces of the lateral plates 213F, 213R of the first coupling unit 210 or face the inner surfaces of the lateral plates 213F, 213R with little gap. Further, the tongue 216 of the first coupling unit 210 is located in the front recess 3231 of the adaptor 3200 in part and the first support protrusions 3241F, 3241R are fitted to the V-shaped notches 217F, 217R or face them with a slight gap. Thereafter, to fix the adaptor 3200 and first coupling unit 210 to each other, the slide cover 3300 is slid towards the adaptor 3200 in the first movement direction MD1. As the slide cover 3300 is slid towards the adaptor 3200 in the first movement direction MD1, the first hood 3343 of the slide cover is positioned above the tongue 216 of the first coupling unit 210 and the first push surfaces 3341F, 3341R are brought into contact with the contact surface 214 of the first coupling unit 210. If the slide cover 3300 is further slid towards the adaptor 3200 in the first movement direction MD1, the slide cover 3300 pushes the first coupling unit 210 against the first support protrusions 3241F, 3241R via the first push surfaces 3341F, 3341R and the contact surface 214 and the first hood 3343 of the slide cover 3300 covers the tongue 216 of the first coupling unit 210. Accordingly, the first coupling unit 210 and the connector assembly 3000 are fixed to each other by the slide cover 3300 in both the front and rear directions FRD and the vertical directions VD. In this case, the fixation in the front and rear directions FRD is the state where the slide cover 3300 pushes the first coupling unit 210 to the first support protrusions 3241F, 3241R via the first push surfaces 3341F, 3341R. Further, the fixation in the vertical direction VD is the state where the first hood 3343 of the slide cover 3300 covers the tongue 216 of the first coupling unit and the first support protrusions 3241F, 3241R are caught to the V-shaped notches 217F, 217R. The fixation in the horizontal direction HD between the first coupling unit 210 and the adaptor 3200 is achieved through the contact between the outer surfaces of the lateral walls 3211F, 3211R of the insertion portion 3210 and the inner surfaces of the lateral plates 213F, 213R of the first coupling unit in the state where the slide cover 3300 is moved to said fixation position in the first movement direction MD1. When separating the first coupling unit 210 and the adaptor 3200 connected to each other, the latch protrusions 3224 are pushed laterally inwardly and the slide cover 3300 is moved from the adaptor 3200 in the second movement direction MD2. Then, the first hood 3343 is moved away from the tongue 216 and the first push surfaces 3341F, 3341R are out of contact with the contact surface 214 of the first coupling unit 210. Thereafter, the adaptor 3200 and the first coupling unit 210 are separated in the procedures reverse to the above-described procedures.

Figure 46:
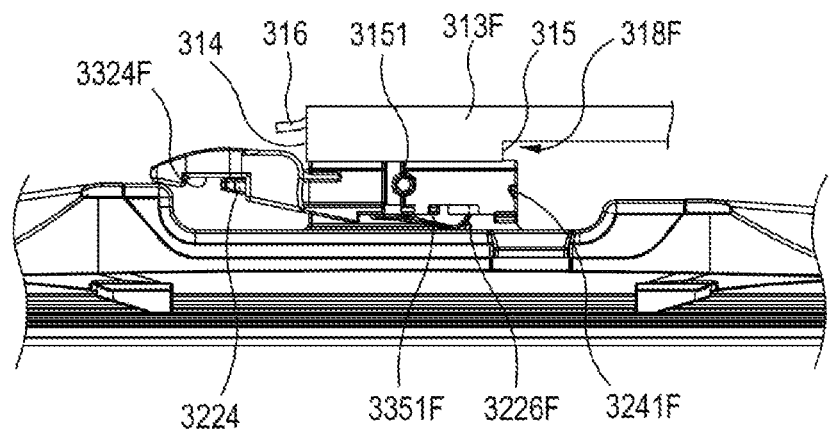
FIGS. 46 to 48 show a connection example between the wiper blade according to an embodiment and the second wiper arm.
Figure 47:
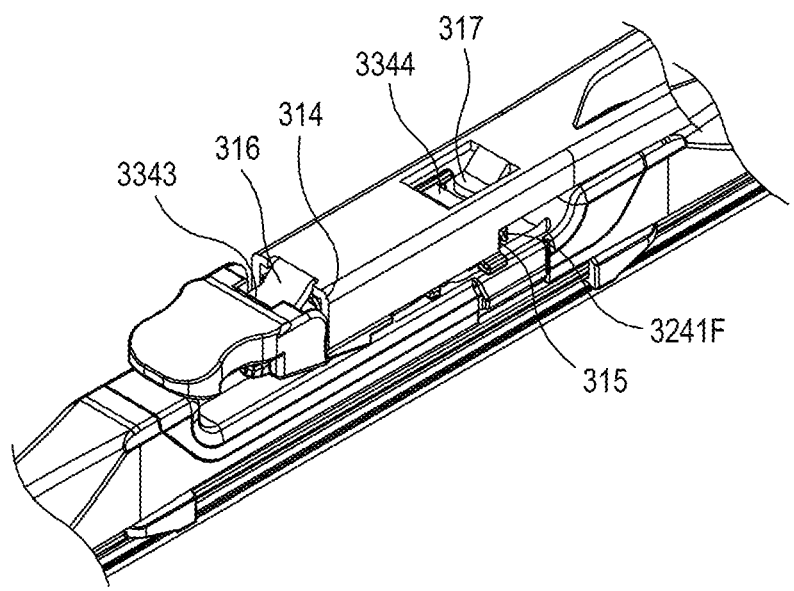
Figure 48:
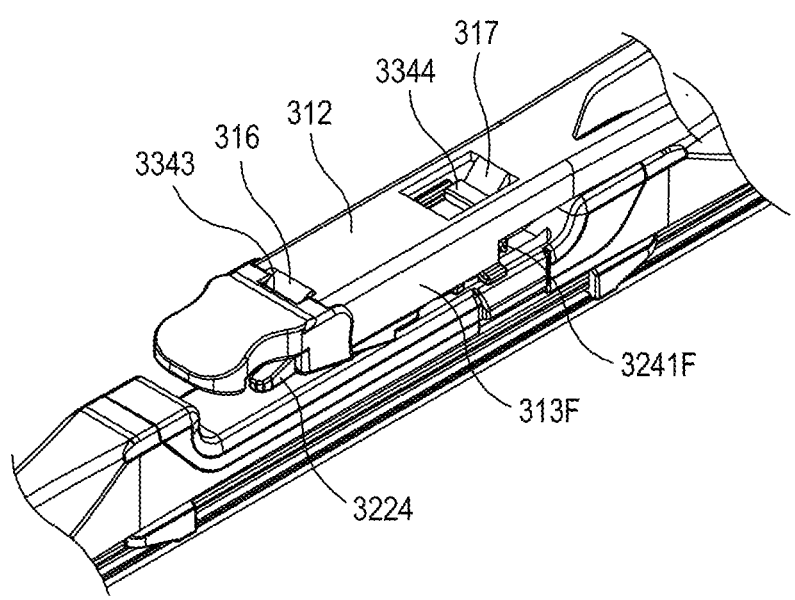

FIGS. 46 to 48 show a connection example between the wiper blade 100 according to an embodiment and the second wiper arm 300.

As shown in FIG. 46, the insertion portion 3210 of the adaptor 3200 is inserted to the receiving portion 311 of the second coupling unit 310 in the state where the slide cover 3300 is maintained in said release position. At this time, the first support protrusions 3241F, 3241R can be positioned with a slight gap between the second support protrusions and the support surface 315 of the second coupling unit 310 in the first movement direction MD1 or can contact the support surface 315. As shown in FIG. 47, if the insertion portion 3210 of the adaptor 3200 is fully inserted, then the top wall 3212 of the insertion portion 3210 contacts the under surface of the top plate 312 of the second coupling unit 310 and the lateral walls 3211F, 3211R of the insertion portion 3210 contact the inner surfaces of the lateral plates 313F, 313R of the second coupling unit 310 or face the inner surfaces of the lateral plates 313F, 313R with little gap. Further, the first tongue 316 of the second coupling unit 310 is located in the front recess 3231 of the adaptor 3200 in part and the second tongue 317 of the second coupling unit 310 faces the rear recess 3232 of the adaptor 3200. Further, the first support protrusions 3241F, 3241R of the adaptor are fitted to the L-shaped notches 318F, 318R or face the L-shaped notches 318F, 318R with a slight gap. Thereafter, to fix the adaptor 3200 and second coupling unit 310 to each other, the slide cover 3300 is slid towards the adaptor 3200 in the first movement direction MD1. As the slide cover 3300 is slid towards the adaptor 3200 in the first movement direction MD1, the first hood 3343 and second hood 3344 of the slide cover are positioned above the first tongue 316 and the second tongue 317 of the second coupling unit 310 respectively and the first push surfaces 3341F, 3341R of the slide cover are brought into contact with the contact surface 314 of the second coupling unit 310. If the slide cover 3300 is further slid towards the adaptor 3200 in the first movement direction MD1, the slide cover 3300 pushes the second coupling unit 310 against the first support protrusions 3241F, 3241R via the first push surfaces 3341F, 3341R and the contact surface 314 and the first hood 3343 and second hood 3344 of the slide cover 3300 cover the first tongue 316 and the second tongue 317 of the second coupling unit 310 respectively. Accordingly, the second coupling unit 310 and the connector assembly 3000 are fixed to each other by the slide cover 3300 in both the front and rear directions FRD and the vertical directions VD. In this case, the fixation in the front and rear directions FRD is the state where the slide cover 3300 pushes the second coupling unit 310 to the first support protrusions 3241F, 3241R via the first push surfaces 3341F, 3341R. Further, the fixation in the vertical direction VD is the state where the first hood 3343 of the slide cover 3300 covers the first tongue 316 of the second coupling unit and the second hood 3344 of the slide cover 3300 covers the second tongue 317 of the second coupling unit. The fixation in the horizontal direction HD between the second coupling unit 310 and the adaptor 3200 is achieved through the contact between the outer surfaces of the lateral walls 3211F, 3211R of the insertion portion 3210 of the adaptor and the inner surfaces of the lateral plates 313F, 313R of the second coupling unit in the state where the slide cover 3300 is moved to said fixation position in the first movement direction MD1. When separating the second coupling unit 310 and the adaptor 3200 connected to each other, the latch protrusions 3224 are pushed laterally inwardly and the slide cover 3300 is moved from the adaptor 3200 in the second movement direction MD2, thus moving the first hood 3343 and the second hood 3344 from the first tongue 316 and the second tongue 317. Thereafter, the adaptor 3200 and the second coupling unit 310 are separated in the procedures reverse to the above-described procedures.

Figure 50:
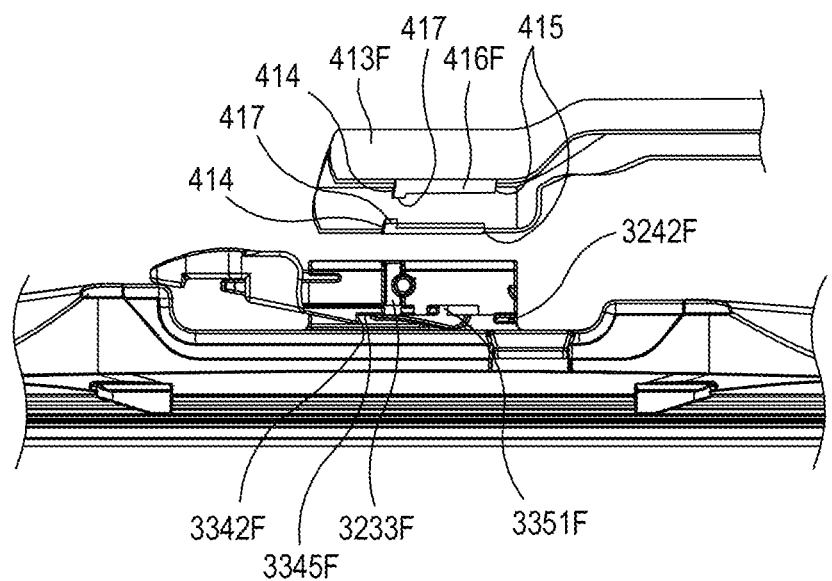
FIGS. 50 to 52 show a connection example between the wiper blade according to an embodiment and the third wiper arm.
Figure 51:
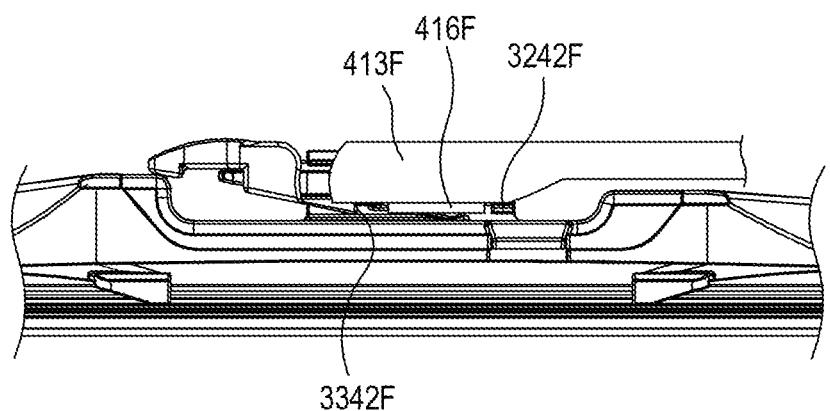
Figure 52:
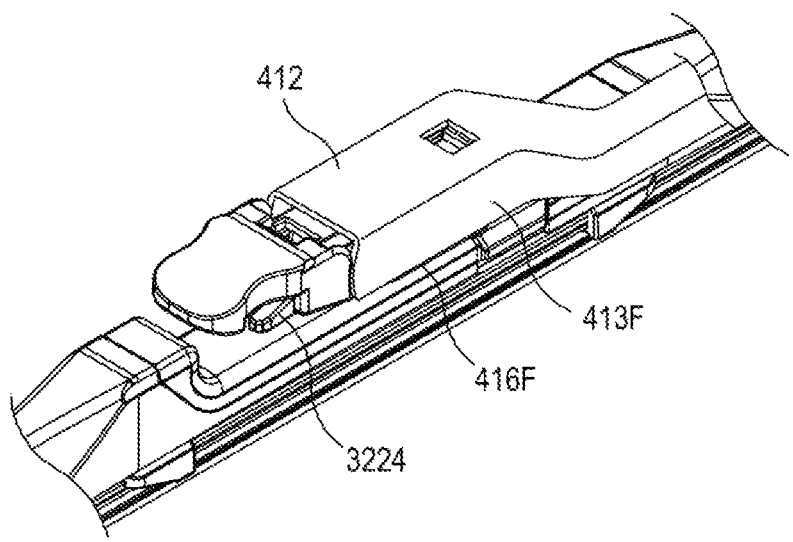

FIGS. 50 to 52 show a connection example between the wiper blade 100 according to an embodiment and the third wiper arm 400.

As shown in FIG. 50, first, the slide cover 3300 is maintained in said release position. When moving the slide cover 3300 from said fixation position to said release position, the engagement pins 3351F, 3351R are moved inwardly of the insertion portion 3210 through interaction between the slope 3352 and the end of the pin groove 3226F, 3226R in the second movement direction MD2. If the engagement pins 3351F, 3351R abut the ends of the pin grooves 3226F, 3226R in the second movement direction MD2, the second push surfaces 3342F, 3342R of the slide cover 3300 are located in the second movement direction MD2 away from the edges of the passage grooves 3233F, 3233R in the second movement direction MD2. Thus, the claws 417 of the third coupling unit 410 can pass the passage grooves 3233F, 3233R and then be inserted up to the second push surfaces 3342F, 3342R. That is, in the state where the slide cover 3300 is maintained in said release position, the insertion portion 3210 of the adaptor 3200 is inserted to the receiving portion 411 of the third coupling unit 410, while the claws 417 of the third coupling unit 410 pass the passage grooves 3233F, 3233R of the adaptor 3200. As shown in FIG. 51, if the insertion of the adaptor 3200 to the third coupling unit 410 is completed, the top wall 3212 of the insertion portion 3210 contacts the under surface of the top plate 412 of the third coupling unit 410 and the lateral walls 3211F, 3211R of the insertion portion 3210 face the inner surfaces of the lateral plates 413F, 413R of the third coupling unit 410. Further, the contact surface 414 of the third coupling unit 410, at which the claw 417 is located, faces the second push surface 3342F, 3342R of the slide cover 3300 in the first movement direction MD1, the top surface of the tongue 416F, 416R of the third coupling unit 410 is positioned slightly lower than the latch surface 3345F, 3345R of the slide cover 3300, and the surface of the tongue 416F, 416R in the first movement direction MD1 (the support surface 415 of the third coupling unit) faces the second support protrusion 3242F, 3242R in the first movement direction MD1. Thereafter, to fix the adaptor 3200 and third coupling unit 410 to each other, the slide cover 3300 is slid towards the adaptor 3200 in the first movement direction MD1. As the slide cover 3300 is slid towards the adaptor 3200 in the first movement direction MD1, the second push surfaces 3342F, 3342R of the slide cover 3300 contact the contact surface 414 of the third coupling unit 410 and thus the slide cover 3300 presses the tongues 416F, 416R of the third coupling unit 410 against the second support protrusions 3242F, 3242R of the adaptor 3200. Thereafter, the latch surfaces 3345F, 3345R of the slide cover 3300 are located above the top surfaces of the tongues 416F, 416R of the third coupling unit 410 and the support surface 415, which is formed in the tongues 416F, 416R of the third coupling unit 410, contact the second support protrusions 3242F, 3242R, thereby fixing the adaptor 3200 and the third coupling unit 410 to each other. As the slide cover 3300 is moved to said fixation position in the first movement direction MD1, the engagement pins 3351F, 3351R protrude laterally outwardly of the pin grooves 3226F, 3226R due to the restoring force of the elastic arms 3353F, 3353R and are positioned above the tongues 416f, 416R of the third coupling unit 410. Therefore, in said fixation position of the slide cover 3300, the tongues 416F, 416R of the third coupling unit are caught to the engagement pins 3351F, 3351R. As such, the third coupling unit 410 and the connector assembly 3000 are fixed to each other by the slide cover 3300 in both the front and rear directions FRD and the vertical directions VD. In this case, the fixation in the front and rear directions FRD is the state where the slide cover 3300 pushes the third coupling unit 410 to the second support protrusions 3242F, 3242R via the second push surfaces 3342F, 3342R and the contact surface 414. Further, the fixation in the vertical direction VD is the state where the top surfaces of the tongues 416F, 416R of the third coupling unit are caught to the latch surfaces 3345F, 3345R and the engagement pins 3351F, 3351R. The fixation in the horizontal direction HD between the third coupling unit 410 and the adaptor 3200 is achieved through the contact between the inner surfaces of the lateral plates 413F, 413R and the lateral walls 3211F, 3211R of the adaptor 3200 or between the inner surfaces of the lateral plates 413F, 413R and the lateral surfaces of the connecting lugs 3313F, 3313R of the slide cover 3300 in the state where the slide cover 3300 is moved to said fixation position. When separating the third coupling unit 410 and the adaptor 3200 connected to each other, the slide cover 3300 is moved from the adaptor 3200 in the second movement direction MD2 and the adaptor 3200 and the third coupling unit 410 are separated in the procedures reverse to the above-described procedures.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wiper blade, comprising:
   a wiper rubber;
   a lever assembly holding the wiper rubber, the lever assembly comprising a plurality of levers, adjacent levers of which are rotatably connected; and
   a connector assembly detachably connected to a wiper arm, the wiper arm including one of first to third coupling units at a distal end, each of the first to third coupling units having: a receiving portion extending in front and rear directions; a contact surface and a support surface for fixation in the front and rear directions; and a tongue for fixation in a vertical direction vertical to the front and rear directions,
wherein the connector assembly includes:
a bracket detachably joined to the lever assembly and having a rotation shaft;
an adaptor rotatably mounted to the bracket through the rotation shaft; and
a slide cover slidably joined to the adaptor, the slide cover being moved to the adaptor in a first movement direction parallel to a longitudinal direction of the lever assembly to fix one of the first to third coupling units to the adaptor, the slide cover being moved from the adaptor in a second movement direction opposite to the first movement direction in the longitudinal direction of the lever assembly to release fixation between the one of the first to third coupling units and the adaptor,
wherein the adaptor includes:
an insertion portion having a pair of lateral walls rotatably coupled to the rotation shaft, the insertion portion being inserted into the receiving portion of the one of the first to third coupling units;
a first support protrusion formed at an end of the insertion portion in the first movement direction and supporting the support surface of one of the first and second coupling units when the one of the first and second coupling units is connected to the adaptor; and
a second support protrusion formed at the end of the insertion portion in the first movement direction and supporting the support surface of the third coupling unit when the third coupling unit is connected to the adaptor, and
wherein the slide cover includes:
a first push surface contacting the contact surface of the one of the first and second coupling units when the one of the first and second coupling unit is connected to the adaptor to push the one of the first and second coupling units towards the first support protrusion in the first movement direction;
a second push surface contacting the contact surface of the third coupling unit when the third coupling unit is connected to the adaptor to push the third coupling unit towards the second support protrusion in the first movement direction;
a hood covering the tongue of the one of the first and second coupling units when the one of the first and second coupling units is connected to the adaptor; and
a latch surface covering at least a portion of a top surface of the tongue of the third coupling unit when the third coupling unit is connected to the adaptor.

2. The wiper blade of claim 1, wherein the adaptor includes a locking latch locking the slide cover when the slide cover fixes the one of the first to third coupling units to the adaptor.

3. The wiper blade of claim 2, wherein the locking latch includes: a finger curvable laterally inwardly and extending from the lateral wall in the second movement direction; and a latch protrusion formed at a tip end of the finger, and
wherein the slide cover includes a latch groove which the latch protrusion engages.

4. The wiper blade of claim 3, wherein the slide cover includes a curved surface portion that is inwardly concave when viewing the slide cover from top,
wherein the latch groove is located in the curved surface portion, and
wherein when the slide cover fixes the one of the first to third coupling units to the adaptor, the latch protrusion protrudes laterally outwardly from the curved surface portion.

5. The wiper blade of claim 4, wherein the latch protrusion includes a curved surface at an end in the first movement direction and the latch protrusion contacts an end of the latch groove in the first movement direction at the curved surface.

6. The wiper blade of claim 1, wherein the slide cover includes an engagement pin movable laterally inwardly and laterally outwardly,
wherein the adaptor includes a pin groove at a bottom edge of the lateral wall of the insertion portion, the pin groove receiving the engagement pin, and
wherein the engagement pin contacts an end of the pin groove in the second movement direction, thereby limiting movement of the slide cover in the second movement direction.

7. The wiper blade of claim 6, wherein the slide cover includes an elastic arm curvable laterally inwardly and laterally outwardly,
wherein the engagement pin is provided in a tip end of the elastic arm, and
wherein the engagement pin includes a slope contacting the end of the pin groove in the second movement direction.

8. The wiper blade of claim 6, wherein the third coupling unit includes a claw protruding from a front end of the tongue of the third coupling unit towards an inside of the receiving portion of the third coupling unit,
wherein the adaptor includes a vertically extending passage groove, through which the claw of the third coupling unit passes, in the lateral wall of the insertion portion, and
wherein when the engagement pin contacts the end of the pin groove in the second movement direction, the second push surface is positioned away in the second movement direction from an edge of the passage groove in the second movement direction.

9. The wiper blade of claim 6, wherein when the slide cover is moved in the first movement direction and fixes the third coupling unit to the adaptor, the engagement pin is positioned above a top surface of the tongue of the third coupling unit.

10. The wiper blade of claim 1, wherein the second push surface and the latch surface adjoin each other and form a right angle therebetween.

11. The wiper blade of claim 1, wherein the tongue of the second coupling unit comprises first and second tongues that are longitudinally apart from each other,
wherein the hood of the slide cover comprises first and second hoods that are apart from each other in the first movement direction, and
wherein the first hood covers the tongue of the first coupling unit or the first tongue of the second coupling unit and the second hood covers the second tongue of the second coupling unit.

12. The wiper blade of claim 11, wherein the slide cover includes: a slider slidably fitted to the adaptor, and a handle extending from the slider in the second movement direction, and
wherein the first hood is formed at an end of the handle in the first movement direction and the second hood is formed at an end of the slider in the first movement direction.

13. The wiper blade of claim 1, wherein the slide cover includes: a slider slidably fitted to the insertion portion of the adaptor; and a pair of slide slots formed in the slider and extending in the first and second movement directions, and
wherein the slider is located inside the insertion portion with both ends of the rotation shaft being fitted to the slide slots.

14. The wiper blade of claim 1, wherein the support surface of the first coupling unit comprises a surface of a V-shaped notch and the support surface of the second coupling unit comprises a surface of an L-shaped notch, and
wherein the first support protrusion supports the V-shaped notch or the L-shaped notch in the second movement direction.

15. The wiper blade of claim 1, wherein the lever assembly includes: a first lever located centrally in the lever assembly and having two first inclined surfaces that extend longitudinally and are spaced apart from each other; and a connector seat provided in the first lever between said two first inclined surfaces,
wherein the connector seat includes:
a seat surface on which the bracket is seated;
a stepped surface extending along a periphery of the seat surface and separating the seat surface from the first lever;
an insertion slot provided at a longitudinal end of the seat surface; and
a pair of snap protrusions located adjacent to the seat surface apart from the insertion slot and protruding in a direction orthogonal to a longitudinal direction of the seat surface, and
wherein the bracket includes:
a contact surface contacting the seat surface;
a flange extending along a periphery of the contact surface contacting the seat surface, the flange fitting on the stepped surface;
an insertion protrusion inserted to the insertion slot of the connector seat; and
a pair of snap slots which the pair of snap protrusions of the connector seat snap-engage respectively, the pair of snap slots being located above a bottom edge of the flange.

16. The wiper blade of claim 15, wherein the flange includes an ear portion formed by a portion of an edge of the flange which is opposite each of the snap slots and protrudes outwardly,
wherein the connector seat includes an auxiliary stepped surface between the stepped surface and a bottom edge of the first lever, the auxiliary stepped surface being continued from the stepped surface, and
wherein the auxiliary stepped surface is located below the snap protrusion.

17. The wiper blade of claim 15, wherein the lever assembly further includes:
a pair of second levers rotatably connected to longitudinal outer ends of the first lever respectively and having a second inclined surface extending longitudinally; and
a pair of third levers rotatably connected to longitudinal inner ends or longitudinal outer ends of the second levers respectively and having a third inclined surface extending longitudinally,
wherein the first lever and the second lever are rotatably connected to each other by fitting between a pair of fitting protrusions provided in one of the first and second levers and a pair of fitting holes provided in the other of the first and second levers, and
wherein the second lever and the third lever are rotatably connected to each other by fitting between a pair of fitting protrusions provided in one of the second and third levers and a pair of fitting holes provided in the other of the second and third levers.

18. The wiper blade of claim 17, wherein the first lever has an end surface, which is inclined towards a longitudinal outer end of the third lever, at the longitudinal outer end thereof,
wherein the second lever has a stepped surface, which is contactable to the end surface of the first lever and is inclined towards the longitudinal outer end of the third lever, and an end surface, which is inclined towards the longitudinal outer end of the third lever, at the longitudinal outer end thereof,
wherein the third lever has a stepped surface which is contactable to the end surface of the second lever and is inclined towards the longitudinal outer end of the third lever, and
wherein the stepped surface of the third lever is inclined towards the longitudinal outer end of the third lever at an angle less than the stepped surface of the second lever.

* * * * *